(12) United States Patent
Walker et al.

(10) Patent No.: US 6,989,782 B2
(45) Date of Patent: Jan. 24, 2006

(54) ULTRA-WIDEBAND RADAR SYSTEM USING SUB-BAND CODED PULSES

(75) Inventors: Michael L. Walker, San Diego, CA (US); David S. Furuno, San Diego, CA (US); Naiel K. Askar, San Diego, CA (US); Gerald D. Rogerson, Poway, CA (US)

(73) Assignee: General Atomics, San Diego, CA (US)

( * ) Notice: Subject to any disclaimer, the term of this patent is extended or adjusted under 35 U.S.C. 154(b) by 53 days.

(21) Appl. No.: 10/851,635

(22) Filed: May 21, 2004

(65) Prior Publication Data

US 2005/0179585 A1 Aug. 18, 2005

Related U.S. Application Data

(60) Provisional application No. 60/473,045, filed on May 22, 2003.

(51) Int. Cl.
  *G01S 7/28* (2006.01)
  *G01S 13/00* (2006.01)

(52) U.S. Cl. .................. 342/134; 342/21; 342/128; 342/130; 342/132; 342/175; 342/194; 342/195; 342/196; 342/200; 342/201; 342/202

(58) Field of Classification Search ............. 342/21, 342/70–72, 82–103, 118, 128–146, 175, 188–197, 342/200–205
See application file for complete search history.

(56) References Cited

U.S. PATENT DOCUMENTS

| | | | |
|---|---|---|---|
| 3,299,427 A | 1/1967 | Kondo | |
| 3,772,697 A | 11/1973 | Ross | |
| 3,889,261 A * | 6/1975 | Sirven | 342/131 |
| 3,896,434 A * | 7/1975 | Sirven | 342/132 |
| 3,945,012 A | 3/1976 | Cooper | |
| 3,987,285 A | 10/1976 | Perry | |
| 4,309,703 A | 1/1982 | Blahut | |
| 4,379,295 A * | 4/1983 | Lewis et al. | 342/201 |
| 4,450,444 A | 5/1984 | Wehner et al. | |
| 4,562,438 A * | 12/1985 | Rouse et al. | 342/201 |
| 4,566,010 A * | 1/1986 | Collins | 342/201 |

(Continued)

OTHER PUBLICATIONS

Gill, Gurnam Singh, *Ultra-Wideband Radar Using Fourier Synthesized Waveforms*, IEEE Transactions on Electromagnetic Compatibility, May 2, 1997, pp. 124-131, vol. 39, IEEE.

(Continued)

*Primary Examiner*—Bernarr E. Gregory
(74) *Attorney, Agent, or Firm*—Fitch, Even, Tabin & Flannery

(57) ABSTRACT

Methods and apparatus are provided for radar systems using multiple pulses that are shorter than the expected range delay extent of the target to be imaged. In one implementation, a method for performing radar includes the steps of: transmitting a plurality of pulses, each pulse having a different center frequency and a time duration shorter than an expected range delay extent of a target, wherein a total bandwidth is defined by a bandwidth occupied by the plurality of pulses; receiving reflections of the plurality of pulses; and performing pulse compression on the received pulse reflections to generate a detection signal having a radar resolution approximately equivalent to the transmission and reception of a single pulse having the total bandwidth. In preferred form, the pulses comprise ultrawideband (UWB) pulses each occupying a sub-band of the overall system bandwidth.

50 Claims, 21 Drawing Sheets

U.S. PATENT DOCUMENTS

| | | | |
|---|---|---|---|
| 4,626,853 A * | 12/1986 | Lee et al. ............... | 342/132 |
| 4,651,152 A | 3/1987 | Harmuth | |
| 4,914,441 A * | 4/1990 | Brookner .................. | 342/196 |
| 4,983,979 A * | 1/1991 | McKenzie ................ | 342/204 |
| 5,095,312 A | 3/1992 | Jehle et al. | |
| 5,239,309 A | 8/1993 | Tang et al. | |
| 5,345,471 A | 9/1994 | McEwan | |
| 5,361,070 A | 11/1994 | McEwan | |
| 5,376,939 A * | 12/1994 | Urkowitz .................. | 342/134 |
| 5,389,933 A * | 2/1995 | Golinsky ................... | 342/201 |
| 5,414,428 A * | 5/1995 | Gallagher et al. .......... | 342/132 |
| 5,440,311 A * | 8/1995 | Gallagher et al. .......... | 342/132 |
| 5,442,359 A * | 8/1995 | Rubin ........................ | 342/137 |
| 5,499,029 A | 3/1996 | Bashforth et al. | |
| 5,523,760 A | 6/1996 | McEwan | |
| 5,543,799 A | 8/1996 | Heger | |
| 5,592,170 A | 1/1997 | Price et al. | |
| 5,659,320 A * | 8/1997 | Pouit ......................... | 342/145 |
| 5,815,111 A * | 9/1998 | Gouenard et al. .......... | 342/132 |
| 5,867,117 A | 2/1999 | Gogineni et al. | |
| 5,943,004 A * | 8/1999 | Groenenboom et al. .... | 342/128 |
| 5,977,905 A * | 11/1999 | Le Chevalier ............. | 342/136 |
| 6,177,903 B1 | 1/2001 | Fullerton et al. | |
| 6,208,248 B1 | 3/2001 | Ross | |
| 6,208,285 B1 * | 3/2001 | Burkhardt .................. | 342/132 |
| 6,225,941 B1 | 5/2001 | Gogineni et al. | |
| 6,225,943 B1 * | 5/2001 | Curley et al. ............... | 342/137 |
| 6,400,307 B2 | 6/2002 | Fullerton et al. | |
| 6,778,603 B1 * | 8/2004 | Fullerton et al. .......... | 375/238 |
| 2003/0085766 A1 | 5/2003 | Rogerson et al. | |
| 2003/0099299 A1 | 5/2003 | Rogerson et al. | |
| 2003/0202537 A1 | 10/2003 | Rogerson et al. | |
| 2004/0008729 A1 | 1/2004 | Rogerson et al. | |
| 2004/0028011 A1 | 2/2004 | Gehring et al. | |
| 2004/0028012 A1 | 2/2004 | Walker et al. | |
| 2004/0048574 A1 | 3/2004 | Walker et al. | |

OTHER PUBLICATIONS

Harris, Fredric J., *On The Use Of Windows For Harmonic Analysis With the Discrete Fourier Transform*, Proceedings of the IEEE, Jan. 1, 1978, pp. 51-83, vol. 66, IEEE.

Park, Joongsuk et al., *A New Millimeter-Wave Step-Frequency Radar Sensor For Distance Measurement*, IEEE Microwave and Wireless Components Letters, Jun. 6, 2002, pp. 221-222, vol. 12, IEEE.

Rihaczek, August W., *Principles Of High-Resolution Radar*, 1969, Chapter 7, pp. 226-255.

Wehner, Donald R., *High-Resolution Radar*, Second Edition, 1995, pp. 149-161, Artech House, Boston, London.

* cited by examiner

ULTRA-WIDEBAND RADAR SYSTEM USING SUB-BAND CODED PULSES

This application claims priority to U.S. Provisional Application No. 60/473,045, filed May 22, 2003, entitled ULTRA-WIDEBAND RADAR SYSTEM USING SUB-BAND CODED PULSES, the entire disclosure of which is incorporated herein by reference.

RELATED APPLICATIONS

This application is related to U.S. patent application Ser. Nos. 10/255,111 now U.S. Pat. No. 6,895,059 ("METHOD AND APPARATUS FOR DATA TRANSFER USING A TIME DIVISION MULTIPLE FREQUENCY SCHEME", filed Sep. 26, 2002); U.S. Ser. No. 10/371,065 ("METHOD AND APPARATUS FOR DATA TRANSFER USING A TIME DIVISION MULTIPLE FREQUENCY SCHEME WITH ADDITIONAL MODULATION", filed Feb. 20, 2003); U.S. Ser. No. 10/372,075 ("METHOD AND APPARATUS FOR DATA TRANSFER USING A TIME DIVISION MULTIPLE FREQUENCY SCHEME SUPPLEMENTED WITH POLARITY MODULATION", filed Feb. 20, 2003); U.S. Ser. No. 10/371,799 ("FLEXIBLE METHOD AND APPARATUS FOR ENCODING AND DECODING SIGNALS USING A TIME DIVISION MULTIPLE FREQUENCY SCHEME", filed Feb. 20, 2003); U.S. Ser. No. 10/371,064 ("METHOD AND APPARATUS FOR ADAPTING MULTI-BAND ULTRA-WIDEBAND SIGNALING TO INTERFERENCE SOURCES", filed Feb. 20, 2003); U.S. Ser. No. 10/371,074 ("METHOD AND APPARATUS FOR ADAPTING SIGNALING TO MAXIMIZE THE EFFICIENCY OF SPECTRUM USAGE FOR MULTI-BAND SYSTEMS IN THE PRESENCE OF INTERFERENCE", filed Feb. 20, 2003); and U.S. Ser. No. 10/255,103 now U.S. Pat. No. 6,781,471 ("TUNABLE OSCILLATOR", filed Sep. 26, 2002); all of which are incorporated herein by reference.

BACKGROUND

1. Field of the Invention

This invention relates to radar systems, and more specifically to radar systems that are used in applications that require low cost, low power consumption, low probability of detection, jam resistance, or where another radar system is present.

2. Background Information

The first applications for radar focused on the detection of airborne objects at large range. Today, this powerful tool has been applied to many other useful applications. Examples include burglar alarms, systems used to determine the speed of moving vehicles, and modules that are used to open automatic doors.

Many of these applications arose as the complexity and cost of radar technology was reduced. The use of new solid state devices for the generation and detection of rf and microwave radiation, as well as the proliferation of microprocessors, digital signal processors, and application specific integrated circuits have contributed to the availability of radar systems that are simpler and less expensive. As the price of radar technology continues to fall, new applications will come into play.

Many of these applications will benefit from low power consumption, especially if the application requires the use of battery power. One example is an automatic faucet control for a sink. The control module is required to turn on the water when a person has placed his hand under the faucet. Ideally, the module will be battery powered, and have a battery life in excess of one year. For applications such as these, low power consumption is critical.

In certain applications, the radar must operate without being detected. Additionally, the radar must be resistant to both unintentional and intentional interference. Improvements in these areas will result in radar systems with greater utility.

There are a number of emerging applications that require operation of two or more radar sensors in the same general location. One example of this is for vehicular collision avoidance systems in automobiles and trucks. Each radar system must be able to operate in an environment where many other radar transmitters are present. A second example is in support of sensor networks. Sensor networks may involve the use of two or more collocated radar systems, and so each radar sensor must operate properly in the presence of the other.

A number of radar applications require high range resolution for detection of intended targets. Range resolution is defined as the minimum resolveable distance between two point scatterers separated in range. Resolution of several feet may be adequate for some radars intended to simply detect airborne targets, while resolutions of one foot or less may be desired for other applications such as detection of targets in ground clutter or for use in generating distributed range return signals which can be used for discriminating between different targets.

The conceptually simplest method to achieve high range resolution is to transmit a very short radio-frequency pulse. Individual scatterers which are separated in range by distance greater than the pulse width can be resolved upon reception by the radar of their reflections of this short pulse. Historically, these very short pulses have been difficult to generate with sufficient power for use in practical radar systems.

Over the past several years, development of new technologies have enabled the transmission and reception of very short radio-frequency pulses and their use in practical radars. These methods have come to be known as Ultra-Wideband (UWB) for the extremely wide bandwidths necessarily present in the spectra of these pulses.

Standard UWB radar designs exploit their high bandwidth in order to transmit a narrow impulse type signal. This narrow pulse allows high range resolution returns from targets while maintaining low transmitted power. The following are some examples of radar designs which transmit and receive a very short UWB pulse having a pulse width that defines the system bandwidth: U.S. Pat. No. 3,772,697, entitled BASE BAND PULSE OBJECT SENSOR SYSTEM by Ross; U.S. Pat. No. 4,651,152, entitled LARGE RELATIVE BANDWIDTH RADAR by Harmuth; U.S. Pat. No. 5,095,312, entitled IMPULSE TRANSMITTER AND QUANTUM DETECTION RADAR SYSTEM by Jehle, et. al.; U.S. Pat. Nos. 5,345,471 and 5,523,760, entitled ULTRA-WIDEBAND RECEIVER by McEwen; U.S. Pat. No. 5,361,070, entitled ULTRA-WIDEBAND RADAR MOTION SENSOR by McEwen; U.S. Pat. No. 5,543,799, entitled SWEPT RANGE GATE RADAR SYSTEM FOR DETECTION OF NEARBY OBJECTS by Heger; U.S. Pat. Nos. 6,177,903 and 6,400,307, entitled SYSTEM AND METHOD FOR INTRUSION DETECTION USING A TIME DOMAIN RADAR ARRAY by Fullerton et. al.; and U.S. Pat. No. 6,208,248, entitled QUICK RESPONSE PERIMETER INTRUSION DETECTION SENSOR by Ross. The techniques provided in each of these UWB approaches involve sending a single pulse that utilizes the entire system bandwidth, and the resulting resolution is based upon the system bandwidth.

Additional methods construct and transmit very short pulses using very wide bandwidths through addition and transmission of combinations of carrier waves at discrete frequencies, such as described in U.S. Pat. No. 5,239,309, entitled ULTRA WIDEBAND RADAR EMPLOYING SYNTHESIZED SHORT PULSES by Tang, et. al. and "Ultra-Wideband Radar Using Fourier Synthesized Waveforms" by Gill et. al., IEEE Transactions on Electromagnetic Compatibility, vol. 39, no. 2, May 1997, pgs. 124–131. This results in the shaping of a single UWB pulse which utilizes the entire system bandwidth, upon which the resulting radar resolution is based.

Conventional radars which transmit low resolution narrowband pulses can also achieve high effective range resolution through the use of pulse compression techniques. Pulse compression techniques require the transmission of a signal or set of signals (typically, several hundred radar pulses) comprising a wide frequency band, each of the signals is narrowband and has a duration that is longer than an expected range delay extent for an intended target. Postprocessing of the multiple received low resolution return signals from these signals is used to synthesize range return delay profiles whose resolution is on the order of the inverse of the transmitted/received bandwidth.

One particular type of pulse compression radar is known as a stepped frequency radar. The term stepped frequency refers to the fact that multiple frequencies are transmitted in a stepped (sequential) order, with a fixed frequency separation between successive pulses. In conventional stepped frequency radars, in order to produce a valid range versus return waveform, each fixed frequency transmitted pulse is longer than the expected range delay extent of the target or range information which is to be acquired. Examples of such stepped frequency pulse compression radar systems in which the pulses are longer than the expected range delay extent for the intended target are described in: U.S. Pat. No. 4,450,444, entitled STEPPED FREQUENCY RADAR TARGET IMAGING by Wehner; U.S. Pat. No. 5,499,029, entitled WIDE BAND STEPPED FREQUENCY GROUND PENETRATING RADAR by Bashforth, et. al.; U.S. Pat. No. 5,592,170, entitled RADAR SYSTEM AND METHOD FOR DETECTING AND DISCRIMINATING TARGETS FROM A SAFE DISTANCE by Price, et. al.; and "A new millimeter-wave step-frequency radar sensor for distance measurement", Joongsuk Park; Cam Nguyen, Microwave and Wireless Components Letters, IEEE, vol. 12 Issue: 6, Jun. 2002, pp. 221–222.

A concept similar to this is called hopped-frequency in which the individual narrowband frequency pulses are sent in a non-sequential or randomized order. This can be accomplished in the same manner as step frequency radars with simple modifications to the transmitter and receiver. A number of methods use continuous frequency modulation, the most common being linear frequency modulation (LFM), to achieve resolution equivalent to transmitting and receiving a pulse which uses the entire bandwidth. One example of hopped frequency approach using LFM is described in D. R Wehner, "High Resolution Radar", 2nd Edition, Artech House, Boston, 1995, pgs. 149–161. A similar example describes continuous amplitude modulation, which is described in A. W. Rihaczek, "Principles of High Resolution Radar", McGraw Hill, 1969, pgs. 226–255.

Similarly, all pulses in these approaches have pulse durations that are longer than the expected range delay extent for the intended targets.

There are a number of methods which combine the various methods of step frequency, linear frequency and/or amplitude modulation to achieve resolution equivalent to transmitting and receiving a pulse which uses the entire bandwidth. Some examples are: U.S. Pat. No. 3,945,012, entitled WIDE BAND PULSED ENERGY SYSTEM by Cooper; U.S. Pat. No. 3,987,285, entitled DIGITAL MATCHED FILTERING USING A STEP TRANSFORM PROCESS by Perry; U.S. Pat. No. 4,309,703, entitled SEGMENTED CHIRP WAVEFORM IMPLEMENTED RADAR SYSTEM by Blahut; and U.S. Pat. Nos. 5,867,117 and 6,225,941, entitled SWEPT-STEP RADAR SYSTEM AND DETECTION METHOD USING SAME by Gogineni et. al. Again, all of these approaches must use narrowband pulses having a pulse width which is longer than the target range extent in order to produce a useful range versus scattered radar return waveform.

The pulse compression process which is applied to the stepped frequency and/or hopped frequency radar return signals is essentially the same. At each frequency, a coherent demodulator is employed to compute an in-phase (I) and quadrature-phase (Q) pair of values from each transmitted/received low resolution pulse. We denote these by $I_k$ and $Q_k$, where k=0, 1, 2, . . . , N−1 represents the kth frequency transmitted and received.

Conventional pulse compression processing for stepped and hopped frequency radars is based on a model of the reflected radar returns which assumes that the narrowband returned signal from an extended target is comprised of multiple reflections of the transmitted narrowband sinusoidal pulse which add coherently with different phases. The I and Q value sampled from the return at each frequency can be interpreted as a sample of the Fourier domain representation of the range profile. Thus, the basic premise behind pulse compression for stepped and hopped frequency radars is that the return signal represents a sampled frequency response, from which a range profile is constructed. Accordingly, the duration of the pulses is required to be longer than the expected range delay extent for the intended targets.

An Inverse Discrete Fourier Transform $$H_l = \sum_{k=0}^{N-1} (I_k + jQ_k) e^{j(2\pi/N)lk},$$

typically implemented using a Fast Fourier Transform (FFT), is applied to the frequency domain values to compute the range delay response signal at finitely many range values (see for example, U.S. Pat. No. 4,450,444). The values $H_l$ are referred to as the target's complex range profile. Often, it is simply the magnitude of these values which is used to determine if a target is present in a detection application, for example. Standard techniques such as zero padding the frequency domain samples for improving the sampling frequency in the synthesized time signal and windowing of the frequency domain samples to reduce sidelobes of the synthesized impulse response are often employed, such as described by Harris, Fredric J., "On the Use of Windows for Harmonic Analysis with the Discrete Fourier Transform", Proceedings of IEEE, January 1978, pgs. 51–83.

Another approach using conventional narrowband radar pulses having a duration longer than an expected range delay extent of the intended target is described in U.S. Pat. No. 3,299,427, entitled RADAR SYSTEM by Kondo. Kondo describes radar in which the transmitted signal consists of a train of narrowband pulses of different frequency whose transmission and return at each frequency is delayed so as to produce an alignment of returned signals equivalent to what would occur if all pulses were transmitted simultaneously with no delays in reception.

In contrast to conventional radar systems sending narrowband pulses, it cannot be assumed that a transmitted UWB pulse is longer than the range delay extent of a target of interest. In fact, UWB pulses are typically very much shorter than the range delay extents of almost all targets of interest; thus, pulse compression methods as employed in conventional systems using narrowband pulses, such as a stepped radar approach, are not used with radar systems using very short pulsewidth UWB signals since it would violate the basic assumption behind pulse compression.

SUMMARY OF THE INVENTION

According to several embodiments of the invention, a radar system is provided which uses pulse compression techniques with pulses that are shorter than the range delay extents of almost all targets of interest, in contrast to traditional pulse compression techniques used only with narrowband pulses that are longer than the range delay extents of all targets of interest. The interpretation of the data acquired by the receiver is also different. For traditional pulse compression using narrowband pulses, the data received when transmitting a particular narrowband frequency is interpreted as the frequency response of the entire range extent sampled at the transmission frequency. This is not the case according to several embodiments of the invention in which the scattered return signal for each transmitted frequency represents the response of multiple reflections of the transmitted pulse in the time domain extending over the entire range delay extent.

In one embodiment, the invention can be characterized as a method for performing radar, and a means for accomplishing the method, the method comprising the steps of: transmitting a plurality of pulses, each pulse having a different center frequency and a time duration shorter than an expected range delay extent of a target, wherein a total bandwidth is defined by a bandwidth occupied by the plurality of pulses; receiving reflections of the plurality of pulses; and performing pulse compression on the received pulse reflections to generate a detection signal having a radar resolution approximately equivalent to the transmission and reception of a single pulse having the total bandwidth.

In another embodiment, the invention can be characterized as an apparatus for performing radar comprising: an antenna; a switch coupled to the antenna that switches between transmitting and receiving; a transmitter coupled to the switch, the transmitter configured to transmit a plurality of pulses, each pulse having a different center frequency and a time duration shorter than an expected range delay extent of a target, wherein a total bandwidth is defined by a bandwidth occupied by the plurality of pulses; and a receiver coupled to the switch, the receiver comprising a pulse compression module configured to perform pulse compression on received pulse reflections of the plurality of pulses to generate a detection signal having a radar resolution approximately equivalent to the transmission and reception of a single pulse having the total bandwidth.

DETAILED DESCRIPTION

Figure 1A:
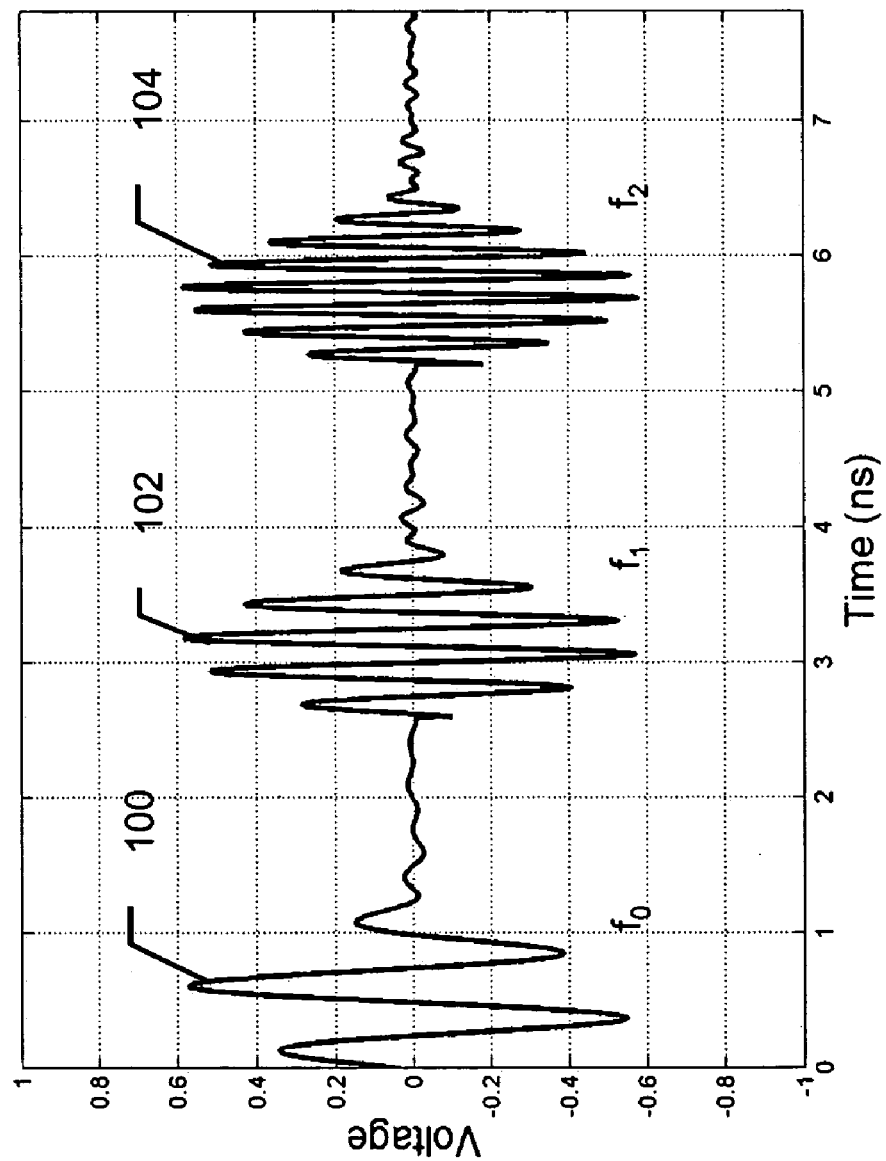
FIG. 1A shows an example of an ultra wideband (UWB) waveform comprised of multiple sub-band transmissions in the time domain according to one embodiment of the invention.

The majority of UWB modulation schemes for communication developed to date have focused on manipulation of the amplitude, timing, and/or polarity of transmitted short impulses. One parameter that has not been fully exploited is the frequency content of the pulses. Recently, so-called sub-band UWB communication methods have been proposed which exploit the ultra-wide bandwidth (e.g., the bandwidth of the signal is greater than 20–50% of the center frequency of the signal) available to these systems through the use of sub-bands of an UWB spectrum. Systems that leverage the frequency content of UWB pulses in this way offer a number of advantages over communication systems that employ conventional UWB signaling. These advantages include increased bit per pulse data density, reduced probability of detection or interception, scalability to higher data rates, and a natural ability to provide adaptive frequency allocation for jamming mitigation and the exploitation of spectrum availability. It is noted that generally, the term 'wideband' denotes a signal whose bandwidth is not less than 2% of its center frequency, and the term 'ultra-wideband' denotes a signal whose bandwidth is not less than 20% of its center frequency. For example, the bandwidth of an ultra-wideband signal may be up to 50% or more of the signal's center frequency. Ultra-wideband signals may be used at frequencies from less than tens of hertz to terahertz and beyond. Although most ultra-wideband use currently falls between 100 MHz and 10 GHz primarily due to present-day regulatory allocations, it is envisioned that future allocations will extend far beyond this frequency range.

Furthermore, the term 'frequency band' denotes a contiguous portion of the frequency spectrum. The term 'center frequency' as applied to a frequency band denotes a frequency at the arithmetic mean of the frequencies at the boundaries of the frequency band. The term 'bandwidth' refers to the width of the frequency band, that is, the difference between the frequencies at the upper and lower boundaries. In one embodiment, the bandwidth is defined as being bounded by the points in frequency that are 10 dB lower than the highest radiated emission. As defined herein, frequency bands may be adjacent to one another and non-overlapping, but may also be disjoint or overlapping.

The term 'pulse' or 'burst' denotes the emission of an amount of energy within a particular range of frequencies and over a limited period of time. A pulse may include one or more cycles of a waveform (e.g. a sine wave). A pulse may even be limited to less than one cycle of a waveform. In some applications, two or more pulses may be transmitted simultaneously. Initiating the transmission of a pulse is also referred to as 'triggering' the pulse.

The term 'time slot' denotes a defined period of time that separates moments at which pulses may be triggered. A period of time may be divided into a continuous series of consecutive and non-overlapping time slots of equal duration. Alternatively, a period of time may be divided into a series of consecutive and non-overlapping time slots of varying duration. In a complex high-speed system, the length of a time slot may be measured in picoseconds. In a lower-speed system of less complexity, the length of a time slot may be in the nanosecond range. In other applications, time slots of shorter or greater length may be used as desired.

The term 'cluster' denotes a representation of encoding information into a time-ordered sequence of pulses in one or more frequency bands. The term 'cluster interval' denotes the period between the start of transmission of a cluster and the start of transmission of the next cluster and includes any 'quiet time' between the clusters. 'Quiet time' periods between clusters may be especially useful, for example, in asynchronous applications. In such cases, it may be desirable for the duration of a quiet time period to be greater than the duration of a time slot.

Figure 1B:
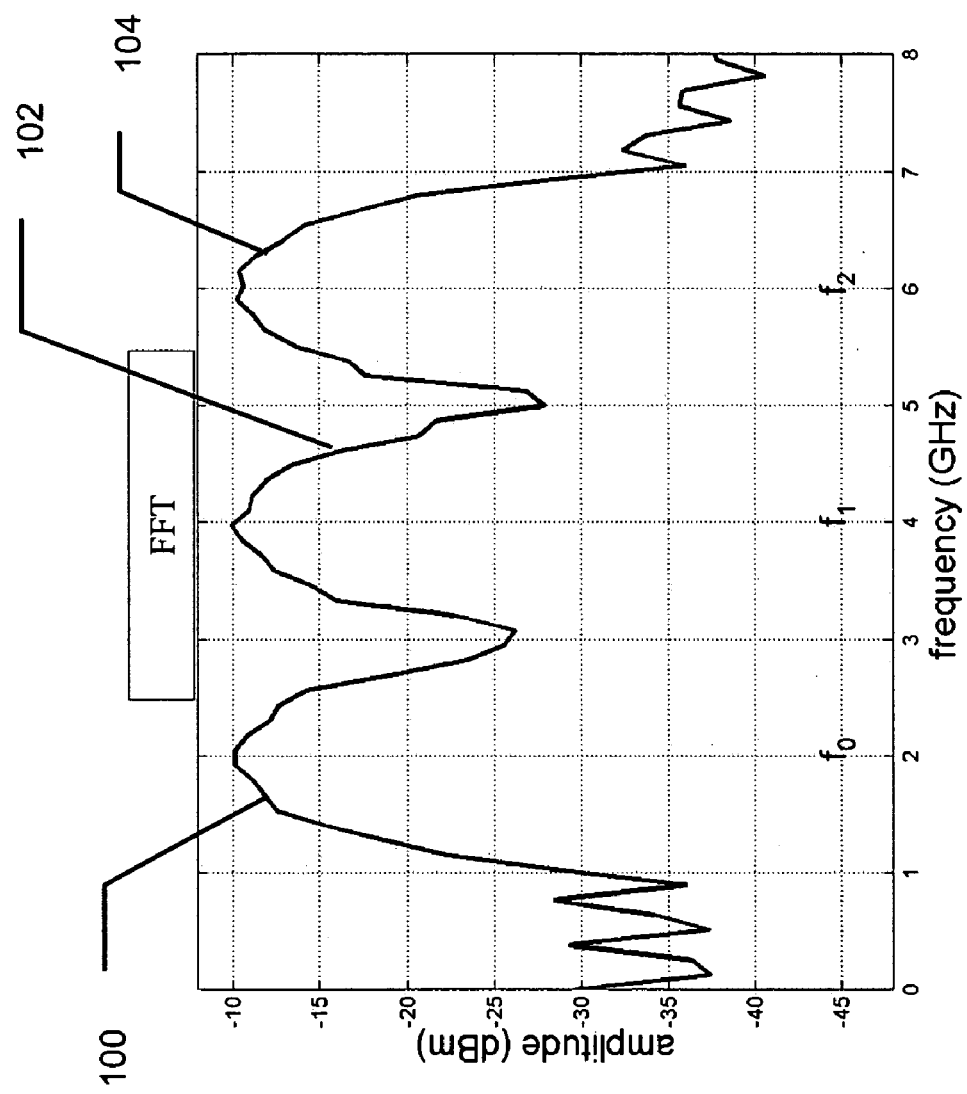
FIG. 1B shows the spectrum of the UWB waveform of FIG. 1A.

One sub-band communication approach is described in U.S. patent application Ser. No. 10/255,111 now U.S. Pat. No. 6,895,059 (filed Sep. 26, 2002, entitled METHOD AND APPARATUS FOR DATA TRANSFER USING A TIME DIVISION MULTIPLE FREQUENCY SCHEME). In this modulation method, information is encoded through the time dependence of frequency components within the UWB pulse. In effect, the UWB pulse (i.e., cluster) consists of a sequence of smaller pulses, each of which is centered on a different frequency. The order of the frequencies within the pulse carries the information. For example, the order of transmission of pulses across the multiple sub-bands defines a symbol, the symbol corresponds or maps to defined bits. FIG. 1A shows an example of a UWB cluster modulated in this manner consisting of a time-sequence of three pulses (or bursts), e.g., a first pulse 100 at $f_0$, a second pulse 102 at $f_1$ and a third pulse 104 at $f_2$. Each pulse lies within a different and easily distinguishable frequency band as shown in the frequency domain of FIG. 1B. According to one transmission scheme, a cluster of pulses $f_0$, $f_1$ and $f_2$, transmitted in successive time slots encodes a symbol, which corresponds to a specific set of data. This scheme also provides one example of a radar waveform as described more fully throughout this specification.

This multiple sub-band scheme can also be augmented with amplitude modulation, polarity modulation, or other modulation schemes known in the art on each of the clusters to increase the data rate even further, for example, such as described in U.S. patent application Ser. No. 10/371,065 (filed Feb. 20, 2003, entitled METHOD AND APPARATUS FOR DATA TRANSFER USING A TIME DIVISION MULTIPLE FREQUENCY SCHEME WITH ADDITIONAL MODULATION, which is incorporated herein by reference) and U.S. patent application Ser. No. 10/372,075 (filed Feb. 20, 2003, entitled METHOD AND APPARATUS FOR DATA TRANSFER USING A TIME DIVISION MULTIPLE FREQUENCY SCHEME SUPPLMENTED WITH POLARITY MODULATION", which is incorporated herein by reference). In one implementation, this scheme looks at the modulation of the signaling in each of the sub-bands as well as looking at the timing of the transmission and/or reception of each of the sub-bands for the encoding of information. An example is a 3 band system, where each pulse has polarity modulation and the timing of the arrival of the 3 modulated pulses collectively map to a specific symbol of defined bits.

Figure 2:
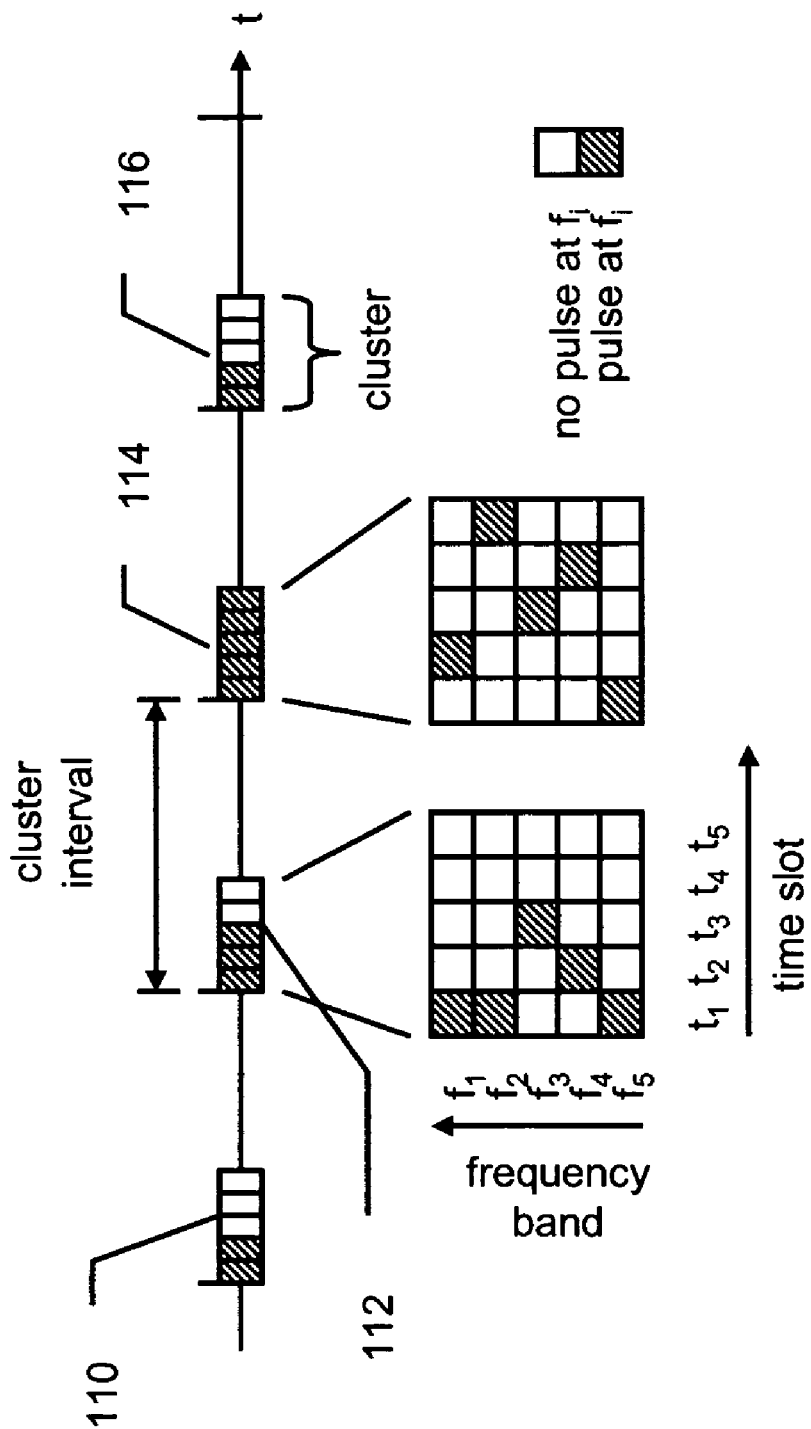
FIG. 2 shows several examples of multi-band clusters, each composed of multiple pulses or bursts in different frequency bands according to several embodiments of the invention.

FIG. 2 illustrates a sequence of multi-band clusters, e.g., clusters 110, 112, 114 and 116 each composed of multiple pulses in different frequency bands with a cluster interval between the start of successive clusters. These clusters may be used for communication purposes or as described in more detail below, for a sub-band radar system. In this example, there are five available frequency bands, $f_1$, $f_2$, $f_3$, $f_4$ and $f_5$. Pulses (indicated in shaded time slots) are transmitted in one of five time slots in one of five frequency bands. In a radar scheme according to several embodiments of the invention as described more fully below, a time ordered sequence of pulses in one or more frequency bands (sub-bands) defines a radar waveform. In one communication scheme, the time dependence of pulses across frequency for each cluster encodes a symbol, the symbol mapping to specific data. In cluster 112, it can be seen that multiple pulses may be transmitted at the same time (i.e., three pulses are transmitted in the first time slot), while in cluster 114, only one pulse is sent during each time slot. Additionally, the polarity, amplitude, width and/or polarization of each pulse may be modulated to encode additional bits into the cluster. In a radar system, a particular frequency and time sequence of pulses forming a cluster may be used to improve range resolution and in certain circumstances also to aid in suppressing interference from similar collocated radars.

Since signal pulses used in sub-band communications are defined by bandwidths $B_{sub}$ less than the full UWB bandwidth $B_{UWB}$ being used, their individual pulse widths are not defined by the inverse of $B_{UWB}$ but rather by the lower resolution defined by the inverse of $B_{sub}$. According to several embodiments of the invention, a method similar to the pulse compression employed for standard long pulse radar systems is applied using sub-banded UWB pulses such that extremely high effective resolution radar range profiles using the full UWB bandwidth can be generated.

A sub-band radar provides a number of unique advantages over conventional UWB radar sensors. Because each pulse can be encoded with significant data, the system is resistant to false alarms caused by noise signals, and can also provide significant immunity to electronic countermeasure. In addition, the use of coded waveforms is essential to the operation of a sensor net (such as described below with reference to FIGS. 22–23). Each node in the net is likely to receive UWB pulses from adjacent nodes in the net as well as its own radar returns. The use of coded pulses allows the radar receivers at each node to optimize reception by using a matched filter based on the coded pulses.

According to several embodiments of the invention, a radar system is provided where the transmitted pulses are broad bandwidth Ultra-Wideband (UWB) signals in which the occupied frequency spectrum is divided into two or more sub-bands. Pulses whose pulse width is much less than the range delay extent of intended targets are transmitted. Each pulse has a spectrum having a different center frequency, and in preferred embodiments, each pulse has a spectrum centered within a different frequency sub-band.

A synthetic range profile (also referred to as a 'detection signal') is reconstructed from the signals received in the multiple sub-bands after reflection from a target. This synthetic range profile has range resolution defined by the inverse of the entire UWB bandwidth. Additionally, the time relationship of the pulses transmitted within the sub-bands can be used to encode information, such that the receiver can identify the specific pulse sequences sent by the transmitter and reject other pulses. The rejected pulses may be generated by other similar UWB radar systems, conventional UWB radar systems, unintentional emitters of UWB pulses, or intentional emitters of UWB pulses.

The information encoded on these pulses can also form the basis for communications simultaneous with the radar transmission. For example, in a network of radar sensors, communication and cooperation between multiple sensors in a networked field of sensors can improve significantly on the ability of a single sensor to detect intrusions into the sensor field.

In several embodiments, the invention improves upon the prior art by enabling reliable operation under non-ideal, real world conditions. This includes applications where other radar systems and noise sources are present, or where UWB or narrowband jammers are being used to intentionally defeat the radar system. It also improves upon prior art by requiring fewer frequencies (e.g., between 2 and 10) than conventional narrow band pulse compression techniques, while able to more easily produce better resolution than impulse type UWB radars.

Additionally, a system in accordance with several embodiments of the invention transmits a low power spread spectrum waveform and offers low probability of detection. Such a system may be implemented using common low cost, low power integrated circuit processes.

Also, the use of UWB waveforms that are broken into spectral sub-bands can simplify the mitigation of ground bounce cancellation. In this phenomenon, the direct path radiation destructively interferes with radiation reflected from the ground. The use of sub-bands centered on different frequencies allows the system to select the sub-band(s) with the best received signal.

Another embodiment of this invention may be considered to be a special case of the sub-band pulse compression radar. A radar may use one or more of the sub-bands individually to form range profiles. The resolution within one sub-band is defined by the pulse width used within that sub-band, which is not as fine a resolution as when using more than one sub-band with pulse compression. All other advantages of the sub-band approach still hold, including the ability to use frequency agility to operate in a strongly interfering environment, to adapt the radar to that environment, and to use the radar transmission simultaneously as a communications mechanism.

Thus, according to several embodiments and in a broad sense, a radar system is described which uses pulse compression techniques with pulses (e.g., sub-banded UWB pulses) that are shorter than the range delay extents of almost all targets of interest, in contrast to traditional pulse compression techniques using narrowband pulses that are longer than the range delay extents of all targets of interest. The interpretation of the data acquired by the receiver is also different. For traditional pulse compression using narrowband pulses, the data received when transmitting a particular narrowband frequency is interpreted as the frequency response of the entire range extent sampled at the transmission frequency. This is not the case for the method according to several embodiments of the invention in which the scattered return signal for each transmitted frequency represents the response of multiple reflections of the transmitted pulse in the time domain extending over the entire range delay extent. Generally, pulse compression is understood to be the process of taking some collection of signals, each occupying a portion of a total bandwidth and constructing a response having a resolution given by the total bandwidth occupied by the collection of signals.

Figure 3:
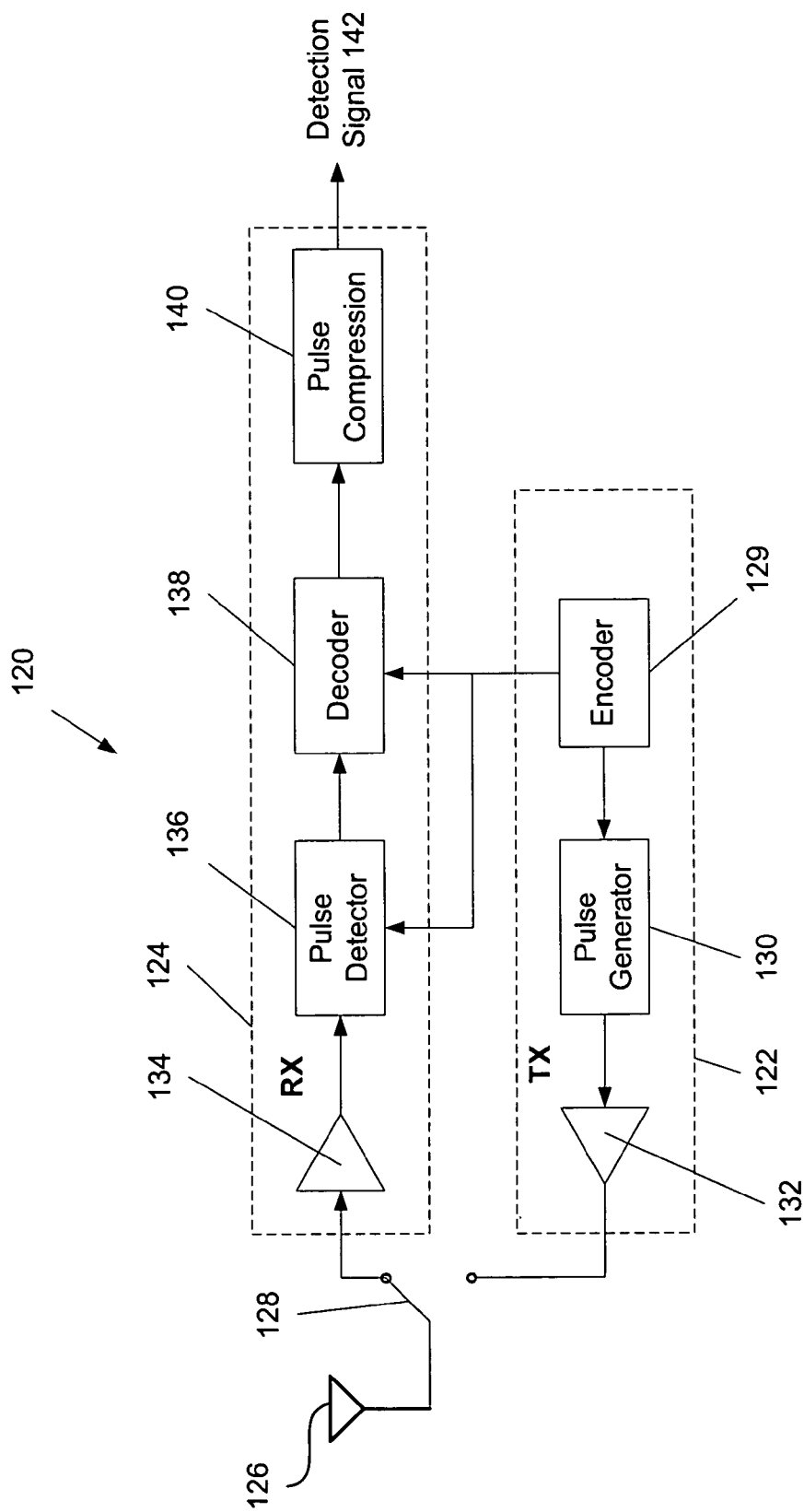
FIG. 3 is a block diagram of a radar transceiver device that applies pulse compression techniques to process transmitted pulses having a pulse duration shorter than an expected range delay extent for the intended targets in accordance to several embodiments of the invention.

Referring next to FIG. 3, a block diagram is shown of a radar transceiver device that applies pulse compression techniques to process transmitted pulses having a pulse duration shorter than an expected range delay extent for the intended targets in accordance to several embodiments of the invention. In a monostatic radar implementation consistent with one embodiment of the invention, a radar device 120 includes a transmitter portion 122 (also referred to as a transmitter) and a receiver portion 124 (also referred to as a receiver or matched filter receiver) connected to an antenna 126 using a Transmit/Receive (T/R) switch 128. The transmitter portion includes an encoder 129 (also referred to as a controller or trigger generator), a pulse generator 130 (also referred to as a burst generator) and an optional power amplifier 132. The receiver portion 124 includes an optional low noise amplifier (LNA) 134, a pulse detector 136 (also referred to as a burst detector), a decoder 138 and a pulse compression module 140 and outputs a detection signal 142.

The pulse generator 130 receives signaling from a controller or encoder 129 that causes the pulse generator 130 to generate or trigger multiple pulses, each having a different center frequency and a time duration shorter than an expected range delay extent of a target. Generally, as used throughout this specification, the expected range delay extent of a target refers to the detection window that the system is attempting to image, e.g., a fixed distance defined by the target/s that are to be imaged. For a single, isolated target such as an aircraft this might be the length of the target itself. In the case that ground clutter is being imaged one-dimensionally to produce RCS (radar cross section) versus range profiles for detection purposes, the range delay extent is defined by the clutter window length in range. In preferred form, the pulse generator 130 generates a UWB cluster of multiple short UWB pulses or bursts, each centered at a different frequency is transmitted, according to a defined time and frequency sequence. For example, the waveforms illustrated in FIGS. 1A–2 illustrate different embodiments of the pulses output from the pulse generator 130. Preferably, each of the pulses has a time duration shorter than an expected range delay extent of a target, each pulse has a different center frequency, each pulse is transmitted in a separate non-overlapping, time slot, and each pulse occupies sub-bands of a total UWB bandwidth. When the frequency bands are referred to as overlapping or not, generally it is noted that the bandwidth of a given frequency sub-band is bounded by the points that are 10 dB below the highest radiated emission such that the majority of the emission is within the frequency sub-band such that the frequency sub-bands are easily distinguishable from each other in frequency. However, depending on the embodiment, one or more the following is applicable: multiple pulses may be sent at the same time; timeslots may be overlapping; the bandwidths of the frequency sub-bands overlap; no pulse is sent in one or more frequency sub-bands; and the bandwidth of the transmitted frequency sub-bands is less than the total bandwidth of all available frequency sub-bands.

The time and frequency sequenced pulses forming a cluster are each amplified (as optionally needed) by the amplifier 132 and coupled to the antenna 126 by the switch 128 for transmission.

The receiver portion 124 operates on the reflected pulse return, and synthesizes from it a range profile equivalent of that which would have been received if a much shorter pulse had been transmitted. Thus, in operation, reflections of the transmitted waveform are received at the antenna 126 and routed to the receiver portion 124 by the switch 128. The reflections are optionally amplified (as needed) by the LNA 134 and input to the pulse detector 136. The pulse detector 136 detects the presence of received pulses and outputs to the decoder 138. In many embodiments, the pulse detector 136 includes a complex mixer that provides baseband I and Q data for detected pulses to the decoder 138. In many embodiments, the decoder 138 acts as a simple delay to align the reflected pulses in time, e.g., the decoder 138 may include a sampler to sample the I and Q data for at least one range, then the sampled data aligned in time. In embodiments in which pulses encoded with information are transmitted and received, the pulse detector 136 and/or decoder 138 behaves as a matched filter based on the coded pulses to improve reception of the pulses. The decoder 138 also functions to decode the received pulses into the corresponding information. It is noted that control signals are sent from the encoder 129 to the pulse detector 136 and the decoder 138 indicate the time and frequency sequence of transmitted pulses, so that the receiver 124 can look for the proper pulse reflections.

Once the pulses are aligned, the pulse compression module 140 performs pulse compression on the received pulse reflections and generates a detection signal 142, which represents the range profile. In one embodiment, the detection signal 142 is a complex function D(t) representing the returned signaling versus range as described below, while in other embodiments, the detection signal 142 is the squared amplitude of the function D(t), i.e., $|D(t)|^2$ as described below. Alternatively, as would be evident to one skilled in the art, D(t) or $|D(t)|^2$ could be normalized for range dependence by multiplying by the square of range or fourth power of range, respectively. Advantageously, the detection signal 142 has a radar resolution based on the inverse of the total bandwidth of the transmitted signaling, (e.g., $B_{UWB}$) rather than based on the inverse of the bandwidth of any given pulse (e.g., $B_{sub}$).

Thus, in contrast to known radar systems that use pulse compression techniques on many narrowband pulses (e.g., several hundred pulses) which each have duration longer than the expected range delay extent of the target, several embodiments of the invention apply pulse compression techniques to pulses where the time duration is less than the expected range delay extent of the target. Pulse compression techniques are typically performed in radar systems because the reflected signaling represents a sampled frequency response; however, this is not the case when the duration of the pulses is shorter than the expected range delay extent of the target. It is noted that in accordance with many embodiments, a relatively few number of different pulses occupying different frequency bands are required. For example, the techniques may be applied in a system having at least 2 pulses in different frequency bands, such as between 2 and 10 bands, more preferably, between 2 and 8 and most preferably between 3 and 6 pulses of different bands. Furthermore, in contrast to known impulse UWB radar systems for which pulse compression techniques are not applicable, pulse compression techniques are utilized.

It is noted that in one embodiment, the receiver 124 may be implemented as a matched filter, i.e., in one embodiment, the receiver comprises a matched filter including the pulse compression module 140. The receiver 124 is provided with the known transmitted radar waveform having a known frequency and time sequence (via signaling from the encoder 129). Thus, the receiver 124 acts as a matched filter to provide an optimum receiver for the transmitted waveform. For example, the receiver 124 boosts the signal to noise ratio for the samples that are part of the known waveform and suppresses noise in the received waveform.

The example implementations to be described (such as in FIGS. 6–17) constitute alternative implementations of a matched filter.

Figure 4:
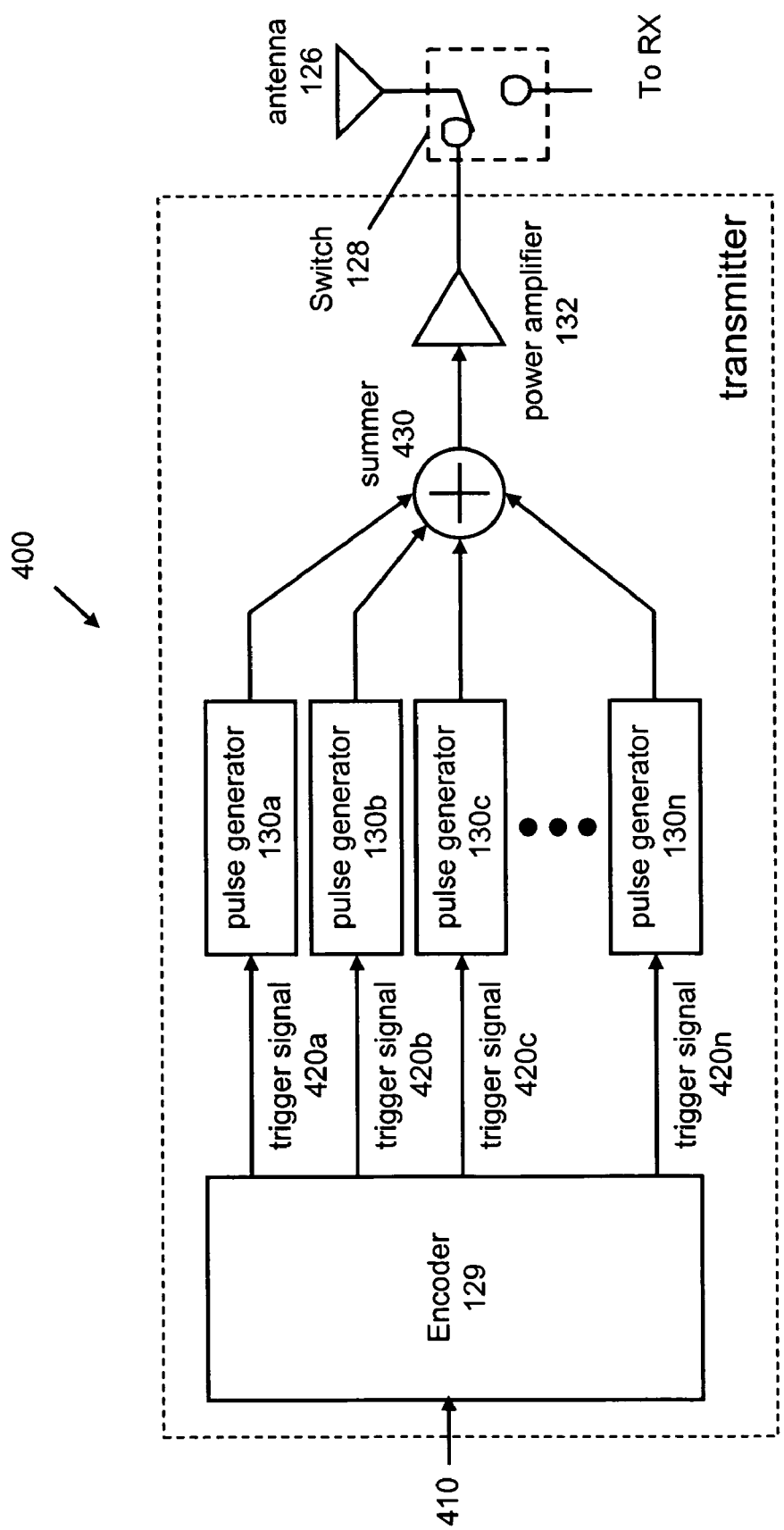
FIG. 4 is a block diagram of one embodiment of a transmitter portion of the radar device of FIG. 3.

FIG. 4 is a block diagram of one embodiment of a transmitter portion 400 of the radar device of FIG. 3. It comprises the encoder 129 coupled to one or more pulse generators 130a through 130n. The pulse generators are configured to emit bursts or pulses in specific frequency bands having a time duration shorter than the expected range delay extent of the target (e.g., ultra-wideband bursts) and are connected to a summer 430. The summer's output is coupled to the input of the optional power amplifier 132. The power amplifier 132 is further connected to the antenna 126 via switch 128. The encoder 129 receives a sequence signal 410 which indicates which frequency pulses are to be transmitted in which order. In some embodiments, the sequence signal 410 may comprise a feedback signal from the receiver portion (such as described with reference to FIGS. 22–23). Optionally, the encoder 129 is preprogrammed with the sequence and does not require a sequence signal 410. For example, the sequence signal defines a frequency and time order of the output waveform. The sequence signal 410 is encoded into a sequence of trigger signals 420a through 420n, which activate the pulse generators 130a through 130n at times according to the encoded sequence signal. In some embodiments, where communications are applied on top of the radar system, the sequence signal also sends data (from a data source) which is encoded into the sequence of trigger signals 420a through 420n. When activated, the pulse generator 130 emits a pulse in its specific frequency band. Summer 430 combines the pulse generator outputs into a signal which is amplified and radiated through antenna 128. In one embodiment, pulse generators 130a through 130n and summer 430 are implemented according to those described in U.S. patent application Ser. No. 10/255,111 U.S. Pat. No. 6,895,059. In some embodiments, pulse generators are activated by a single-bit trigger signal. In other embodiments, pulse generators may be activated using multi-bit trigger signals. It is understood that although the pulse generators 130a through 130n are illustrated as separate components, in actual implementation, the separate functional generators may contain common components.

Figure 5:
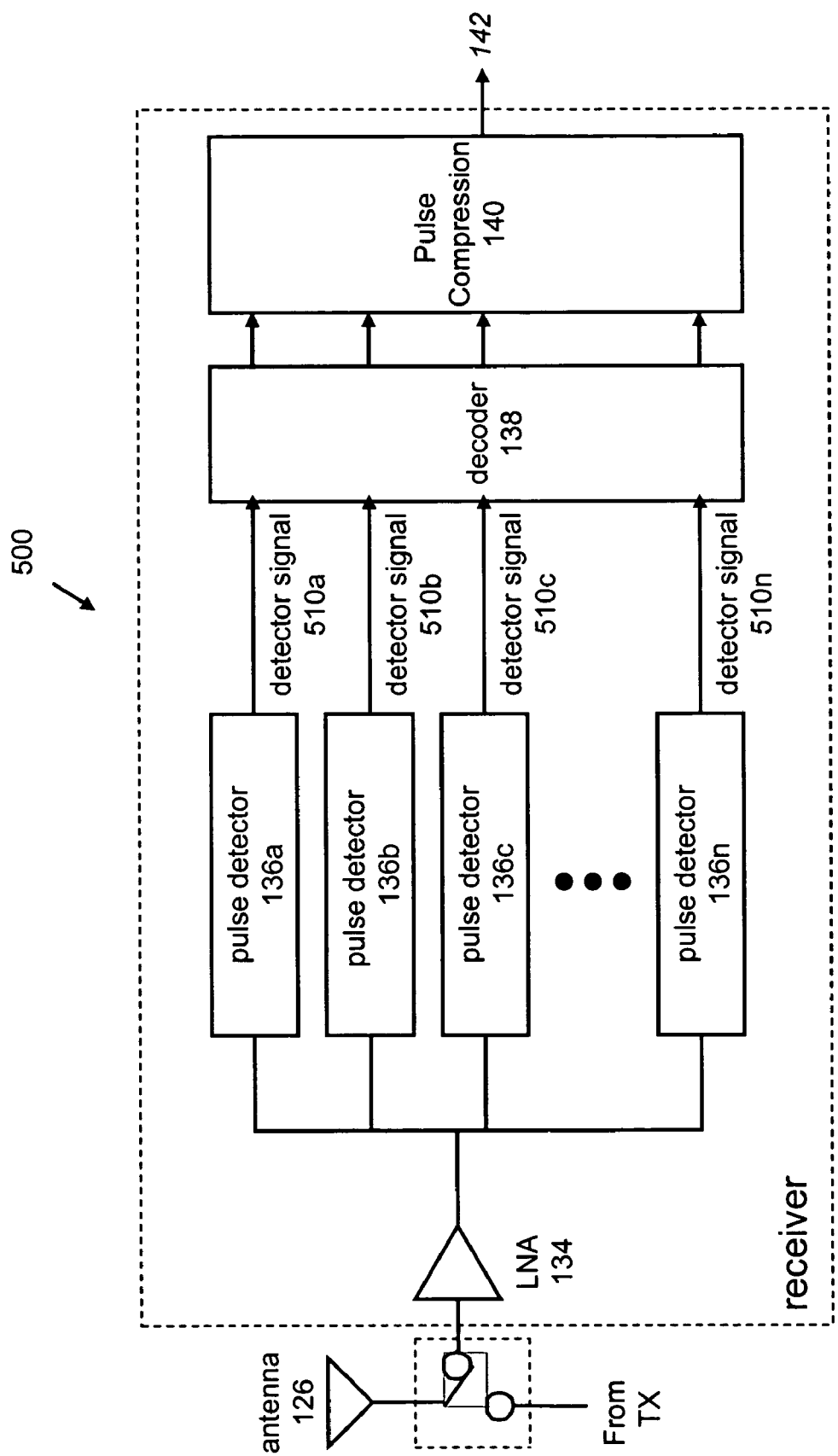
FIG. 5 is a block diagram of one embodiment of a receiver portion of the radar device of FIG. 3.

Referring next to FIG. 5, a block diagram is shown of one embodiment of a receiver portion 500 of the radar device of FIG. 3. Electro-magnetic energy received through antenna 126 is amplified by LNA 134 and fed to pulse detectors 136a through 136n. Pulse detectors 136a through 136n are configured to detect pulses in specific frequency bands. For example, in one embodiment, the pulse detectors 136 include a respective bandpass filter, while in another embodiment, the pulse detectors 136 include a correlator configured to correlate a respective pulse. The output of each pulse detector, detector signals 510a through 510n are coupled to the decoder 138 to be delayed for time alignment. In preferred embodiments, the pulse detectors include complex mixers (e.g., an IQ downconverter) to output complex data (In phase (I) and Quadrature (O) data for processing), the decoder 138 aligns these signals in time and the pulse compression module 140 processes them to produce the detection signal 142.

In embodiments using data communication or other encoded clusters of pulses, the pulse detectors 136a through 136n are configured to communicate the presence or absence of a pulse in each given frequency sub-band through detector signals 510a through 510n, which may be represented with a single bit of information in detector signal 510a through 510n. The decoder 138 decodes a sequence of detected pulses, constituting a cluster, into the corresponding data. For example, the data may represent communications. In other embodiments, the pulse detector 136a through 136n is configured to communicate other and/or additional characteristics of a detected pulse, such as its amplitude, its polarity, or other characteristics know in the art, which may be represented by one or more bits of information communicated to the decoder 138 through detector signals 136a through 136n. Embodiments of pulse detector 136a through 136n and decoders 138 may be found in U.S. patent application Ser. Nos. 10/255,111, now U.S. Pat. No. 6,895,059 U.S. Ser. Nos. 10/371,065, 10/372,075, 10/371, 799, 10/371, 064, and 10/371,074, all of which are incorporated herein by reference. It is noted that although the pulse detector 136 is illustrated as being a separate detector for each frequency sub-band, the different detectors may have common components.

Figure 6:
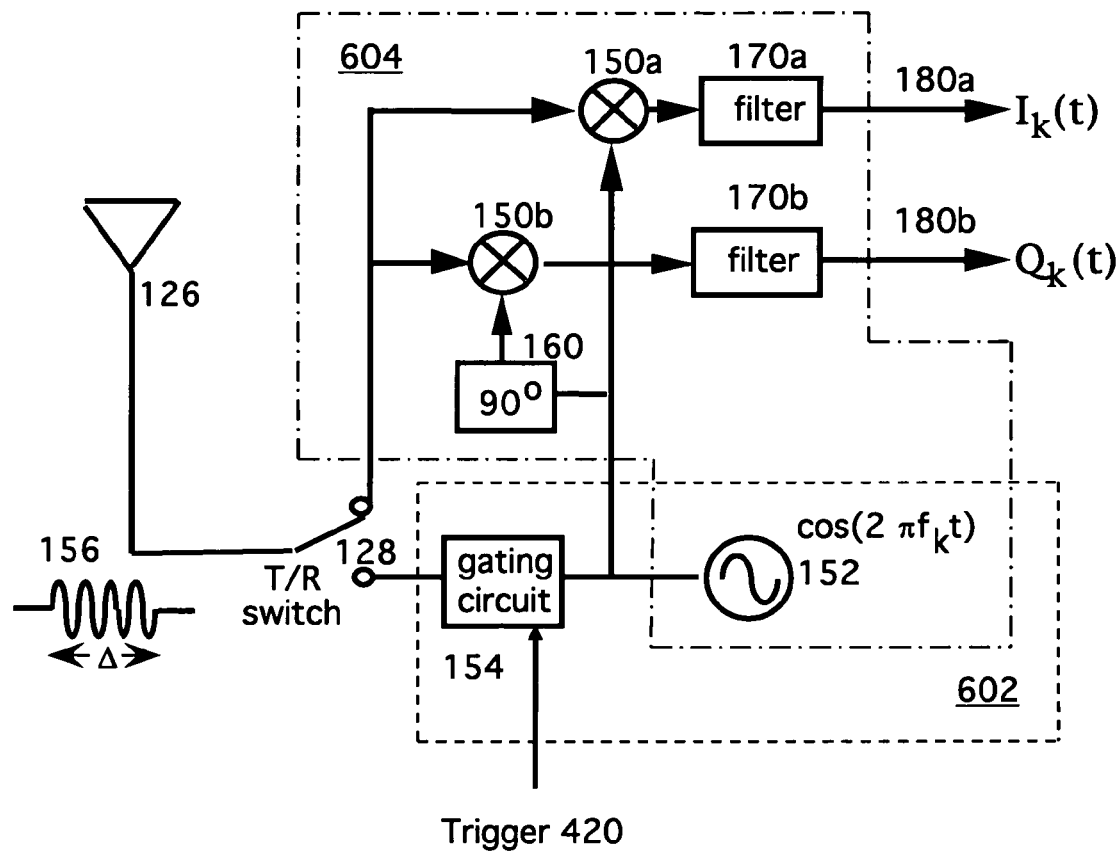
FIG. 6 shows an example transmit/receive circuit of the radar of FIG. 3 for one frequency channel, the k'th channel according to one embodiment of the invention.

FIG. 6 shows one means of transmission and reception for one of the sub-band frequency pulse bursts of the method of an embodiment of the invention. The local oscillator 152 oscillates at $f_k$ Hz. The signal from the local oscillator (LO) 152 is gated by a gating circuit 154 to produce a short burst or pulse 156 of length $\Delta$ seconds centered at the frequency $f_k$ Hz. In one embodiment, the gating circuit 154 for each sub-band frequency is controlled by a controller or encoder (e.g., encoder 129) that sends the appropriate signaling (e.g., trigger signal 420n) to trigger the gating circuit 154 for each of the sub-band frequencies. Accordingly, dashed block 602 represents one embodiment of a pulse generator 130 of FIGS. 3 and 4 that generates a pulse for one of the given frequency sub-bands of the overall bandwidth. A typical pulse length $\Delta$ might be on the order of one to 5 nanoseconds for a frequency $f_k$ of a few GHz, for example. At any rate, the duration or pulse length $\Delta$ is shorter than the expected range delay extent of the desired target, e.g., the pulse length of no more than one half of the expected range delay extent of the target. In preferred embodiments, the generated pulse 156 has a bandwidth that is the minimum of at least 20% of its center frequency or at least 500 MHz. The T/R switch 128 is connected to the output of the gating circuit 154 so that the frequency burst is passed to the antenna 126 and radiated. As is typical in monostatic radar implementations, the early reflected returns representing reflections at a short distance from the transmitter are ignored while the T/R switch 128 is moving from transmit to receive mode. At a fixed delay time after transmission, the T/R switch is connected to the receiver circuit and reception begins. The reflected signal is captured by the antenna 126 and then it is mixed with a copy of the LO signal in mixer 150a and a phase shifted copy (via phase shifter 160) of the LO signal in mixer 150b. These two product signals are then passed through filters 170a and 170b (which are preferably RC bandpass filters) to produce the I and Q signals 180a and 180b for the frequency channel number k. Accordingly, dashed block 604 represents one embodiment of the pulse detector 132 of FIGS. 3 and 5. It is also noted that the pulse detector 604 in basic form, comprises a complex mixer or IQ downconverter that generates I and Q data from each received pulse. It is also noted that in some embodiments, the pulse detector may also be configured to output a detection signal indicating the presence of a given pulse during a given timeslot for decoding purposes.

In preferred form, the local oscillator 152 used in the receiver portion is the same as that used in the transmitter portion so that it defines a phase reference for the returned signals relative to the signal transmitted.

Figure 7:
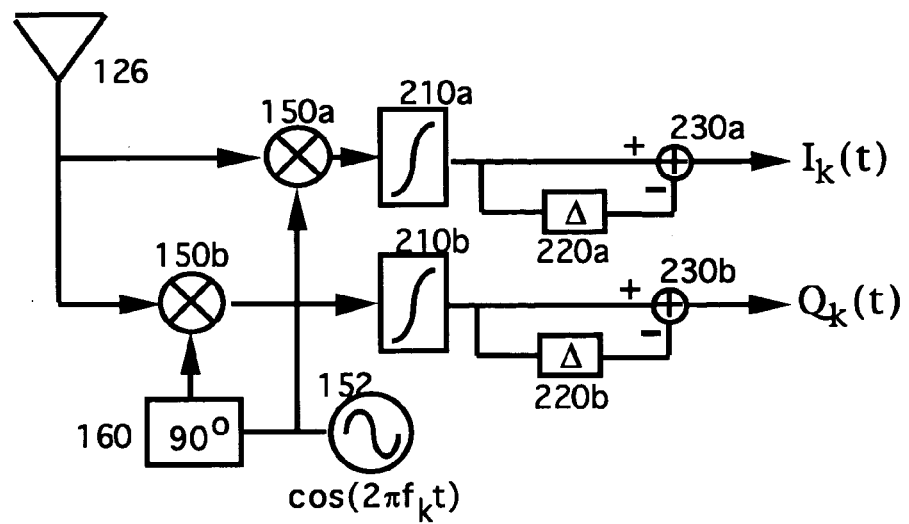
FIG. 7 shows an approximately equivalent circuit for the receiver portion of FIG. 6, to be used in describing how the synthetic range profile is reconstructed.

The filters 170 are designed so as to reach approximately their maximum value in response to a step input after the time $\Delta$ seconds corresponding to a single pulse width. An alternative implementation which can be used to produce approximately the same I and Q signals is shown in FIG. 7. In FIG. 7, the output of the mixers 150a and 150b are coupled to integrators 210a and 210b. Each output of the integrators 210a and 210b is mixed (at one of mixers 230a and 230b) itself and delayed (using delays 220a and 220b) version of itself with a delayed. The method of FIG. 7 is more easily expressed mathematically and will be used to explain how the pulse compression method of several embodiments works.

Referring to FIG. 6, the signal pulse 156 transmitted from the antenna 126 is given by $\chi_{[0,\Delta]}(t)\cos(\omega_k t)$ where $\omega_k = 2\pi f_k$, $f_k = f_0 + k\delta f$ with $\delta f$ defining a constant frequency step size, the function $\chi_S(t)=1$ if t is in the set S and 0 otherwise, and $\Delta$ is the pulse width. Note that this implicitly defines the time axis so that t=0 represents the time just as this pulse is leaving the transmitter. Delays between the antenna and transmitter or between antenna and receiver are not described here. Methods for compensating for these delays are well known in the art. Referring to FIG. 7, the signal received by the antenna 128 which is returned from the range $$R = \frac{c\tau}{2}$$

is given by $$A(\tau)\cos(\omega_k(t-\tau))\chi_{[0,\Delta]}(t-\tau) = \qquad (1)$$
$$A(\tau)(\cos(\omega_k t)\cos(\omega_k \tau) + \sin(\omega_k t)\sin(\omega_k \tau))\chi_{[0,\Delta]}(t-\tau)$$

where $\tau$ is the time delay corresponding to range R and where $A(\tau)$ models both reflection from scatterer(s) at the range R and atmospheric and range attenuation. This received signal is mixed with a copy of the LO signal in mixer 150a and a phase shifted copy of the LO signal in mixer 150b. These two product signals are then passed through integrators 210a and 210b; The output of the integrators are delayed 220 then subtracted 230 from the integrator output signals to produce the I and Q signals for the frequency channel number k. The resulting in-phase (I) signal has the following form:

$$I_k(t) = \int_{t-\Delta}^{t} A(\tau)\cos(\omega_k s)(\cos(\omega_k s)\cos(\omega_k \tau) + \qquad (2)$$
$$\sin(\omega_k s)\sin(\omega_k \tau))\chi_{[0,\Delta]}(s-\tau)ds$$
$$= A(\tau)\int_{-\infty}^{\infty}(\cos^2(\omega_k s)\cos(\omega_k \tau) +$$
$$\frac{1}{2}\sin(2\omega_k s)\sin(\omega_k \tau))\chi_{[\tau,\tau+\Delta]}(s)\chi_{[t-\Delta,t]}(s)ds$$
$$= A(\tau)\cos(\omega_k \tau)\int_{\max(t-\Delta,t)}^{\min(t,\tau+\Delta)}\cos^2(\omega_k s)\,ds +$$
$$A(\tau)\sin(\omega_k \tau)\int_{\max(t-\Delta,\tau)}^{\min(t,\tau+\Delta)}\frac{1}{2}\sin(2\omega_k s)\,ds$$

and a similar expression holds for the quadrature phase (Q) signal. Here it is understood that the result is 0 if $t<\tau$ or $t>2\Delta+\tau$. This follows from the fact that the integrand in line 2 of equation (2) is nonzero only when $\tau<s<t$ and $t-\Delta<s<\Delta+\tau$.

Equation (2) may be rewritten using the notation $$m_{up}(t,\tau) = \min(t, \tau+\Delta)$$

$$m_{low}(t,\tau) = \max(t-\Delta, \tau)$$

as $$I_k(t) = \left[A(\tau)\cos(\omega_k \tau)\int_{m_{low}}^{m_{up}}\left(\frac{1}{2}+\frac{1}{2}\cos(2\omega_k s)\right)ds + \qquad (3)\right.$$
$$\left. A(\tau)\sin(\omega_k \tau)\int_{m_{low}}^{m_{up}}\frac{1}{2}\sin(2\omega_k s)\,ds\right]\chi_{[\tau,\tau+2\Delta]}(t)$$
$$= \left[A(\tau)\cos(\omega_k \tau)\left[\frac{m_{up}-m_{low}}{2} + \right.\right.$$
$$\frac{1}{4\omega_k}(\sin(2\omega_k m_{up}) - \sin(2\omega_k m_{low}))\right] -$$
$$A(\tau)\sin(\omega_k \tau)\left[\frac{1}{4\omega_k}(\cos(2\omega_k m_{up}) - \right.$$
$$\left.\left.\cos(2\omega_k m_{low}))\right]\right]\chi_{[\tau,\tau+2\Delta]}(t)$$
$$\approx A(\tau)\cos(\omega_k \tau)\frac{m_{up}-m_{low}}{2}\chi_{[\tau,\tau+2\Delta]}(t) \text{ and therefore,}$$

nothing that $\frac{1}{2}(m_{up}(t,\tau) - m_{low}(t,\tau))\chi_{[\tau,\tau+2\Delta]}(t) = \frac{\Delta}{2}TRI(t-\tau)$ where $$TRI(t) = \begin{cases} 0, & t \leq 0 \\ (\min(t,\Delta) - \max(t-\Delta,0))/\Delta, & 0 < t < 2\Delta \\ 0, & t \geq 2\Delta \end{cases} \qquad (4)$$

then I and Q can be written as $$I_k(t) = A(\tau)\frac{\Delta}{2}\cos(\omega_k \tau)TRI(t-\tau) \qquad (5)$$
$$Q_k(t) = A(\tau)\frac{\Delta}{2}\sin(\omega_k \tau)TRI(t-\tau)$$

Figure 8:
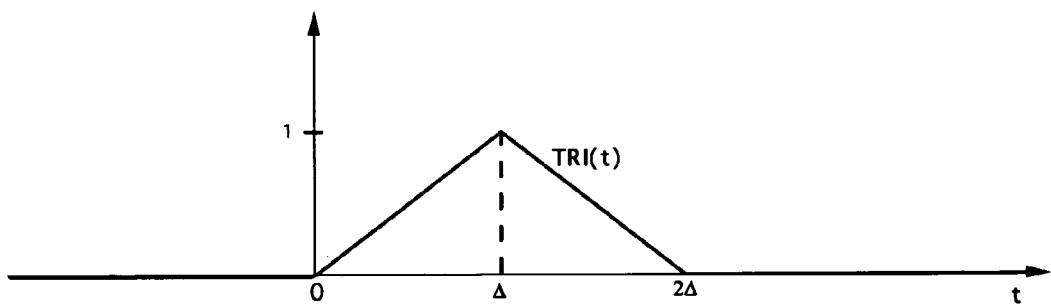
FIG. 8 shows an illustration of the function TRI(t).

The function TRI(t) is illustrated in FIG. 8. The peak value of this function is equal to one and is achieved at $t=\Delta$ and the function is exactly 0 outside the interval $[0,2\Delta]$. The calculation for Q is similar to that for I.

The signal which represents reflections from all ranges $\tau$ of a transmitted pulse of length $\Delta$ centered at frequency $f_k$ can be represented by $$I_k(t) = \int_{-\infty}^{\infty} A(\tau)\frac{\Delta}{2}\cos(\omega_k \tau)TRI(t-\tau)d\tau \qquad (6)$$
$$Q_k(t) = \int_{-\infty}^{\infty} A(\tau)\frac{\Delta}{2}\sin(\omega_k \tau)TRI(t-\tau)d\tau$$

Note that this takes the form of a convolution with convolution kernel equal to TRI(t−τ). Also note that the amplitude returned from a range $$R = \frac{c\tau}{2}$$

is multiplied by $\cos(\omega_k\tau)$ or $\sin(\omega_k\tau)$.

By using the sum of the individual frequency I and Q signals for multiple transmitted frequency pulses whose phase angles have been rotated so as to align, a signal which represents the reflected radar return with a resolution proportional to the inverse of the cumulative bandwidth of these pulses can be constructed. Let $\omega_k = \omega_0 + k(\delta\omega)$, $k=1, 2 \ldots$, $N-1$ represent the radian frequencies, i.e. $\omega_k = 2\pi f_k$, of N transmitted pulses of pulse width Δ, where $\delta\omega = 2\pi\delta f$. Define $$Z_k(t) = I_k(t) + jQ_k(t) = \frac{\Delta}{2}\int_{-\infty}^{\infty} A(\tau)e^{j\omega_k\tau}TRI(t-\tau)d\tau, \quad (7)$$

where $j = \sqrt{-1}$ and define one form of a detection signal 142 as the complex function D(t) defined as $$D(t) = \sum_{k=0}^{N-1} e^{-j\omega_k t}Z_k(t) \quad (8)$$

At any fixed time t, D(t) is can be computed by the Discrete Fourier Transform of the sequence $\{Z_k(t)\}_{k=0}^{N-1}$. Then $$D(t) = \frac{\Delta}{2}\int_{-\infty}^{\infty} A(\tau)\sum_{k=0}^{N-1} e^{j\omega_k(\tau-t)}TRI(t-\tau)d\tau = \quad (9)$$

$$\frac{\Delta}{2}\int_{-\infty}^{\infty} A(\tau)e^{j\omega_0(\tau-t)}\sum_{k=0}^{N-1}(e^{j\delta\omega(\tau-t)})^k TRI(t-\tau)d\tau =$$

$$\frac{\Delta}{2}\int_{-\infty}^{\infty} A(\tau)e^{j\omega_0(\tau-t)}e^{j\ldots}$$

Define the convolution kernel K by $$K(\tau) = e^{-j\omega_0\tau}e^{-j\delta\omega\tau(N-1)/2}\left(\frac{\sin(\delta\omega\tau N/2)}{\sin(\delta\omega\tau/2)}\right)TRI(\tau) \quad (10)$$

then, in preferred form, an alternate detection signal 142 can be expressed as the squared amplitude of the complex function D(t), i.e., $|D(t)|^2$, where D(t) can be seen to be $$D(t) = \frac{\Delta}{2}\int_{-\infty}^{\infty} A(\tau)K(t-\tau)d\tau \quad (11)$$

Figure 9:
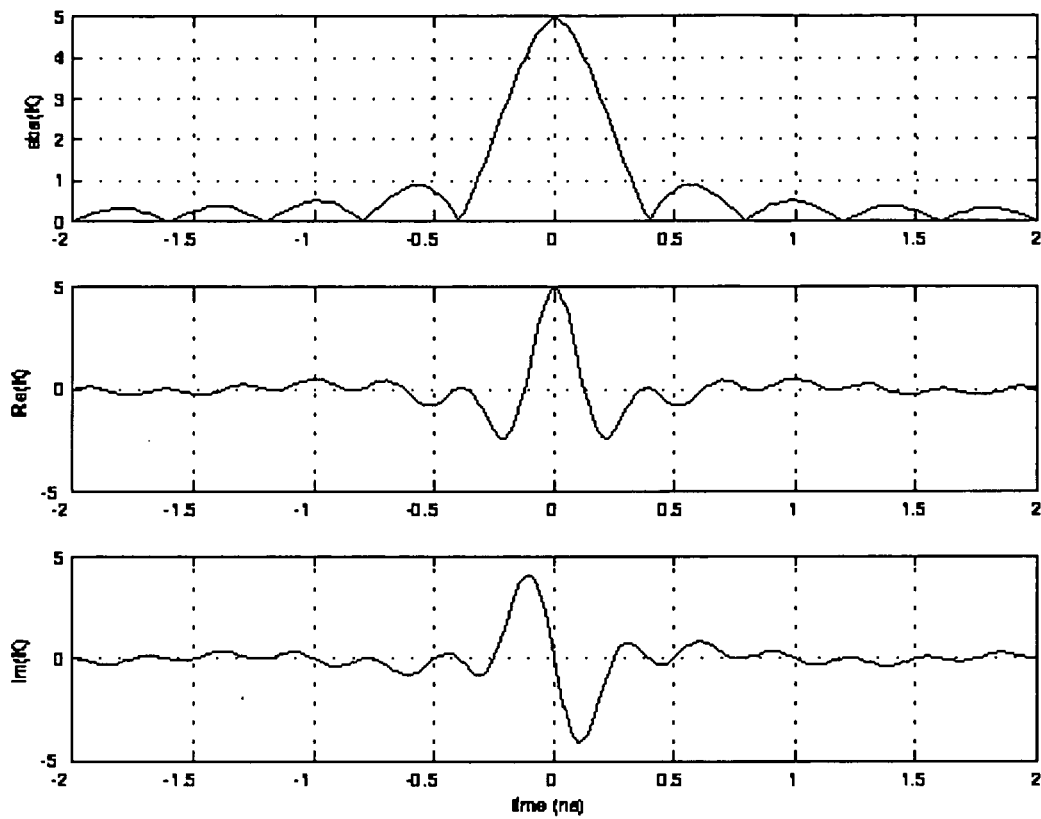
FIG. 9 shows the equivalent compressed pulse from a UWB multi-band radar having 5 frequencies separated by 500 MHz each, for a 2 GHz total bandwidth.

That is, the radar resolution is defined by the kernel K. It is noted that the expression of D(t) in equation (11) is equivalent to the expression of D(t) in equation (8). FIG. 9 shows an example of the amplitude, real part, and imaginary part of the convolution kernel K for the case when $f_0 = 1$ GHz with 5 frequency steps of $\delta f = 500$ MHz, each pulse of width 2 ns, for a total bandwidth of 2.5 GHz. Thus, in preferred form, the range profile or detection signal 142 $|D(t)|^2$ represents returned power versus range, or equivalently, time delay. It is noted that in other embodiments, the function D(t) is used as the detection signal 142, e.g., in embodiments where Doppler calculations are needed.

It is well known (such as described in U.S. Pat. No. 4,450,444, issued to Wehner et al.) that the maximum unambiguous range for a conventional stepped frequency radar is given by $$\frac{c}{2\Delta f}.$$

The argument which demonstrates this is also valid for pulse compression using pulses which are shorter than the range delay extent of the target, e.g., UWB pulses. This implies the requirement $\tau\Delta f \leq 1$, where τ is the width of the pulse, in order to avoid generating aliased copies of the range profile. For the example shown in FIG. 9, $\tau\Delta f = 1$.

In the above description, no restriction was placed on how the I and Q samples were collected, except that at each frequency the I and Q samples collected should represent the convolution with the range impulse response given in equation (6).

There are many options available for transmitting the multiple different frequency pulses. Each could be transmitted individually. In this case, they could be transmitted in any order. Alternatively, all frequencies could be transmitted simultaneously (e.g., during the same timeslot) if sufficient frequency isolation were implemented at the receiver. The separate frequencies need not be transmitted at closely proximate times. For example, if the target or range being illuminated were static, i.e. not moving or moving very slowly relative to the radar, then each individual frequency channel could both transmit and receive a pulse before a different frequency pulse is transmitted, with all I and Q data collected for frequency 1 before moving on to frequency 2 and so on.

There are many implementation methods which could be used to capture the necessary I and Q data. In the following we describe examples of both analog and digital implementations. These examples are for illustrative purpose and are not meant to not limit the scope of the invention.

Figure 11:
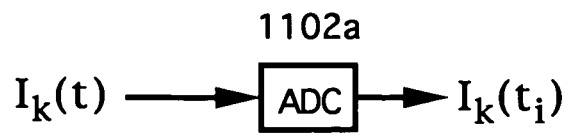
FIG. 11 shows the method of use of analog to digital converters to capture samples of the I and Q signals prior to pulse compression.
Figure 11:
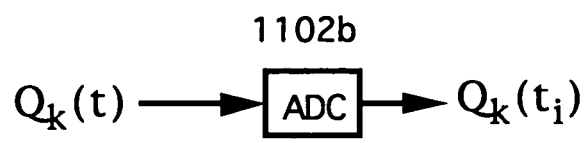
Figure 10:
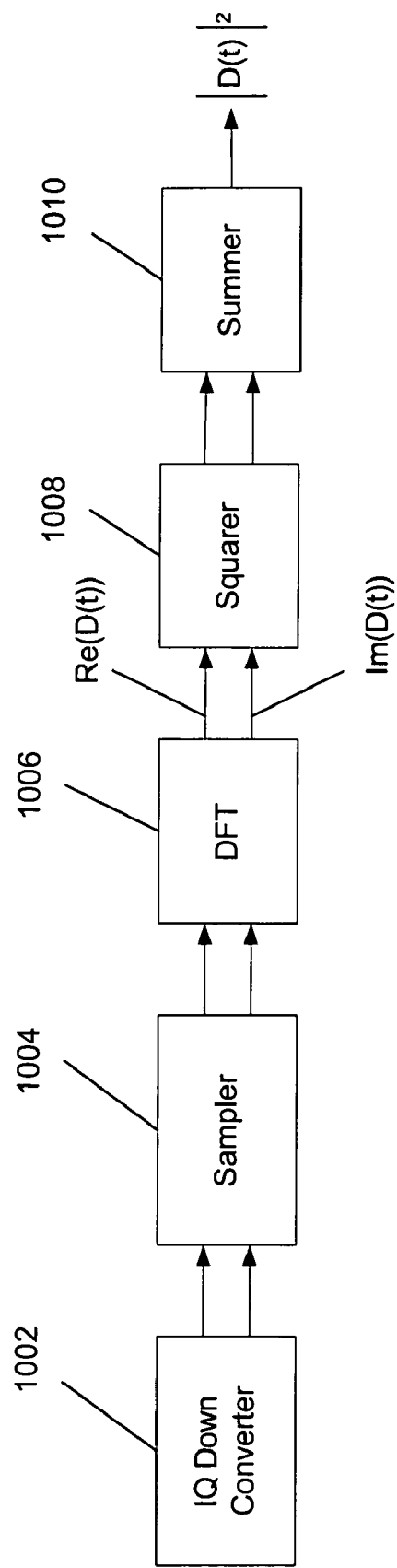
FIG. 10 is a block diagram of digital implementation of the receiver portion including pulse compression according to one embodiment of the invention.

Referring next to FIG. 10, a block diagram is shown of digital implementation of the receiver portion including pulse compression according to one embodiment of the invention. In this embodiment, an IQ downconverter 1002 (also referred to as a complex mixer) is coupled to a sampler 1004, which is coupled to a discrete Fourier transform (DFT) 1006, which is then coupled to a squarer 1008, which is coupled to the summer 1010 to produce the detection signal or range profile, in this case, $|D(t)|^2$. The IQ downconverter 1002 is implemented, for example, within the pulse detector 136 of FIGS. 3, 5 and 6. The sampler 1004 functions as part of the decoder 138 to sample the I and Q data at selected ranges and to delay or align in time the received samples for each of the received frequency pulses for pulse compression processing. The sampler 1004 receives the baseband $I_k(t)$ and $Q_k(t)$ data and outputs digital samples $I_k(t_i)$ and $Q_k(t_i)$ at selected ranges to the DFT 1006. In one example implementation, the sampler 1004 includes analog to digital converters (ADC) to capture the I and Q values at regular intervals, then the captured values are processed digitally by the DFT 1006, the squarer 1008 and the summer 1010 to synthesize the range profile or detection signal. For example, a DFT 1006 is performed at each range on the complex samples constructed from the I and Q data to produce the real components of D(t) (as computed by the DFT 1006) and the imaginary components of D(t), illustrated as the Re(D(t)) and Im(D(t)). The squarer then 1008 squares these real and imaginary components, and the summer 1010 sums them to calculate the squared amplitude of the complex output of the DFT at each selected range, i.e., the detection signal comprises $|D(t)|^2$ in this embodiment. Since many applications will desire a representation of the range profile with 2 or more samples per resolution cell, this requires a very fast ADC. FIG. 11 illustrates the ADCs 1102$a$ and 1102$b$ to capture the I and Q values for frequency k at discrete times $t_i$. This sampling rate is not a requirement for every application as some applications will only need a smaller sampling of locations in range. In this case, the speed of the ADC can be much less. In some applications, the sampling need not be uniform in time, equivalently range, and may use a very small number of samples (as few as 2 or 3) in range. In this example, the DFT 1006, the squarer 1008 and the summer 1010 are implemented as the pulse compression module 140. It is noted that the DFT 1006, the squarer 1008 and the summer 1010 are implemented as part of a digital processor.

An alternative implementation is to use analog processing to produce an analog delay profile signal which represents the range profile. This can then be sampled if desired. Alternatively, detectors can be implemented in analog circuits to operate on this analog representation. One example of an analog detector which does not require sampling of the entire range profile is to use a low-resolution timing circuit with a sample and hold circuit to capture the amplitude at one fixed location, then compare that amplitude with a threshold using a comparator as a method of detection.

Figure 12:
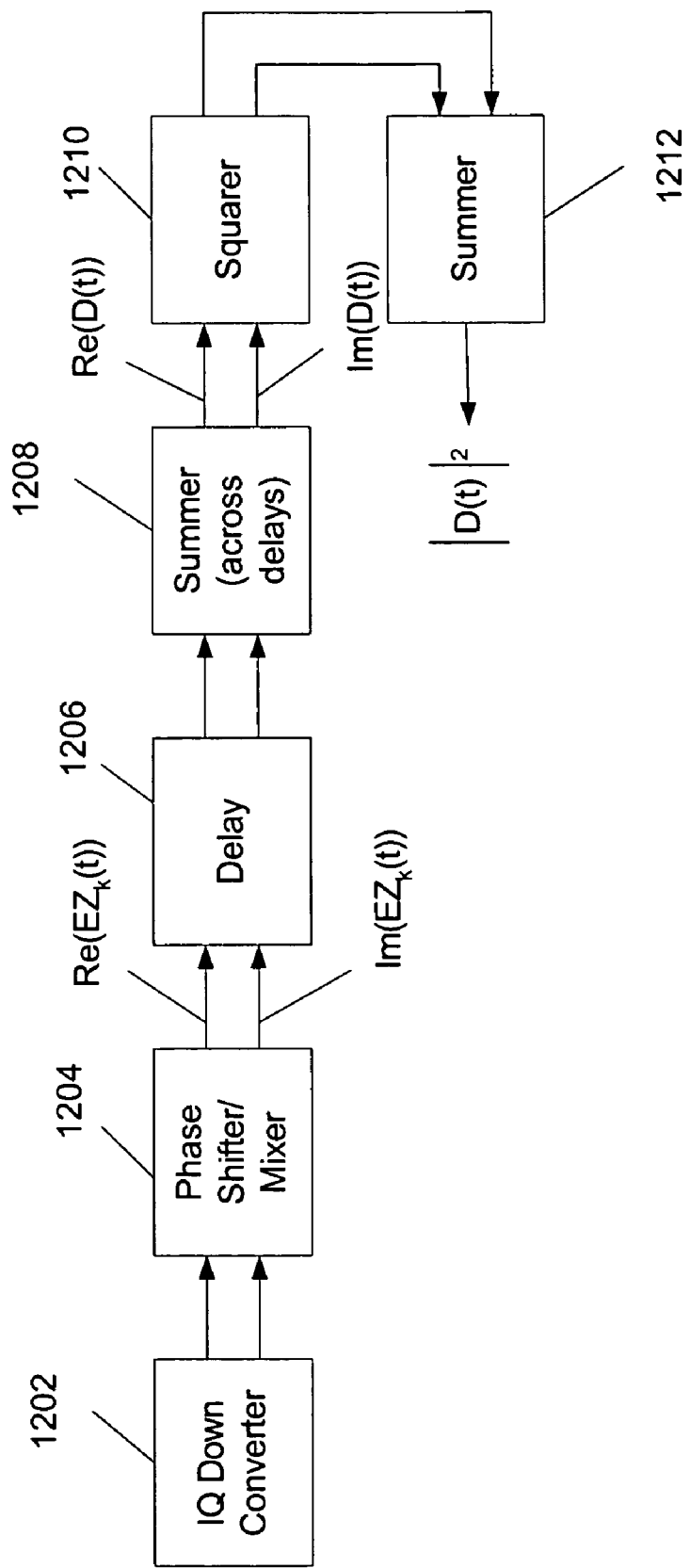
FIG. 12 is a block diagram of an analog implementation of the receiver portion of the transceiver of FIG. 3 according to one embodiment.

Referring next to FIG. 12, a functional block diagram is shown of an analog implementation of the receiver portion of the transceiver of FIG. 3 according to one embodiment. In this embodiment, an IQ downconverter 1202 (e.g., a complex mixer) is coupled to a phase shifter/mixer 1204 (which can generally be referred to as a combiner), which is coupled to a delay circuit 1206, which is coupled to a summer 1208, which is coupled to a squarer 1210, and which is coupled to summer 1212, which outputs the detection signal 142, in this case, $|D(t)|^2$). The IQ downconverter 1202 is implemented, for example, within the pulse detectors 136 described above and outputs the baseband $I_k(t)$ and $Q_k(t)$ signals. The phase shifter/mixer 1204 also functions as a part of the pulse detector 136 and serves to generate analog real and imaginary parts of the intermediate quantity $EZ_k(t)$, which is described in more detail in connection with FIG. 13. In this example, the delay circuit 1206 is implemented in the decoders 138 described above and serves to align the signaling for the k frequency pulses in time. The delay circuit 1206 delays the signaling based on the known spacing of the transmitted pulses. The summer 1208, the squarer 1210 and the summer 1212 are implemented as the pulse compression module 140 and output the detection signal $|D(t)|^2$). Further details of this example are described next.

An example corresponding to the analog implementation of FIG. 12 for a 5 frequency radar system (k=5 frequency bands) can be constructed as follows: Define the intermediate quantities $$EZ_k(t) = e^{-j\omega_k t} Z_k(t) \quad (12)$$
$$= (\cos(\omega_k t) - j\sin(\omega_k t))(I_k(t) + jQ_k(t))$$
$$= (\cos(\omega_k t)I_k(t) + \sin(\omega_k t)Q_k(t)) + j(\cos(\omega_k t)Q_k(t) - \sin(\omega_k t)I_k(t))$$

Figure 13:
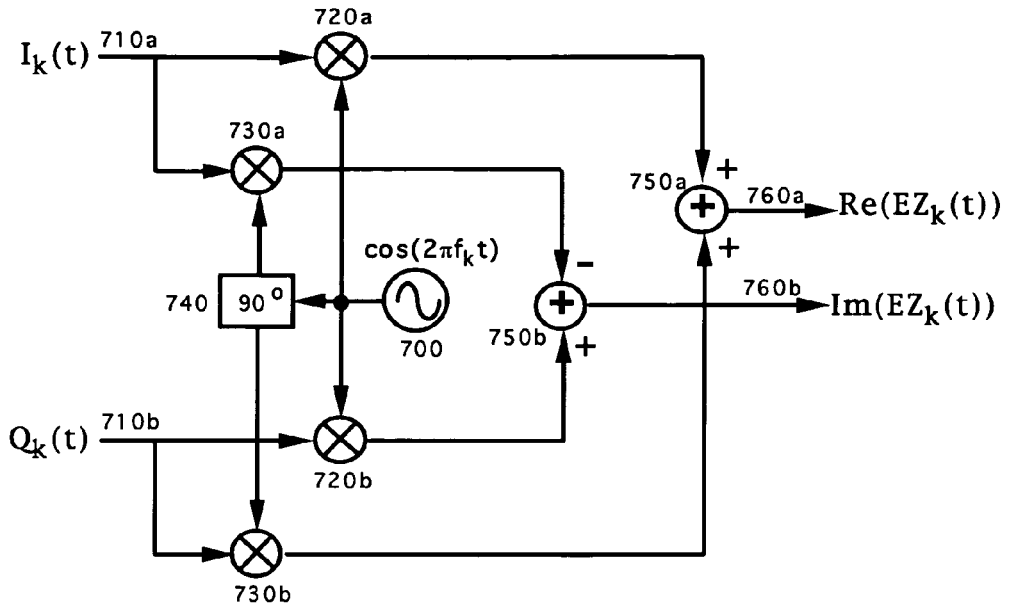
FIG. 13 illustrates one method, such as found in the phase shifter/mixer of FIGS. 12 and 15, for producing analog signals which are used in pulse compression in analog circuitry.

The implementation of this calculation for the kth frequency is shown in FIG. 13. The analog I and Q signals 710$a$ can be generated by the IQ downconverter 1202, e.g., as in either of the circuits shown in FIG. 6 or 7. The local oscillator 700 generates a sinusoidal signal which is mixed 720 with each of the I and Q signals. Typically, the LO 700 will be the LO 152 in FIG. 6, or at least in phase with the LO 152 in order to avoid introducing a fixed but random phase difference. A phase shifted version 740 of the LO signal 700 is also mixed 730 with each of the I and Q signals 710. The result of the two mixing operations 720$a$ and 730$b$ are summed to produce the real part 760$a$ of the intermediate quantity $EZ_k(t)$, labeled as Re($EZ_k(t)$). The result of the mixing operation 730$a$ is subtracted from the result of the mixing operation 720$b$ to produce the imaginary part 760$b$ of the intermediate quantity $EZ_k(t)$, labeled as Im($EZ_k(t)$). Thus, the circuit of FIG. 13 provides one example of the phase shifter/mixer 1204 of FIG. 12.

Figure 14:
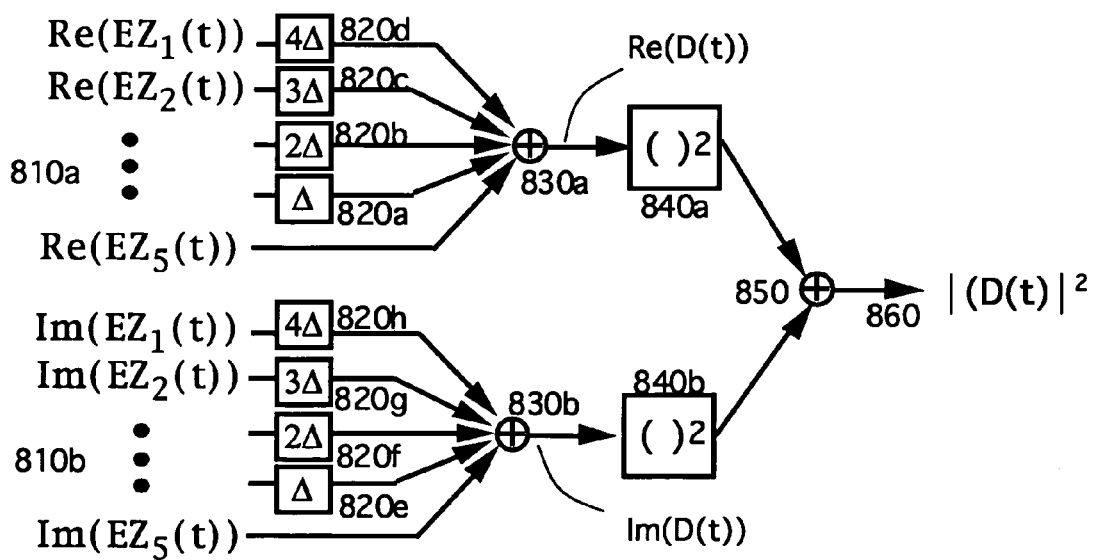
FIG. 14 shows one method of combining incoming analog signals such as those in FIG. 13 to produce an analog signal representing range returns using a delay and sum circuit.

FIG. 14 shows one method of combining the intermediate quantities $EZ_k(t)$, k=0, 1, ..., N−1 to produce a representation of the range delay profile signal, i.e., the detection signal. In this example, it is assumed that the frequencies are transmitted as pulses consecutively in the order $f_1, f_2, f_3, f_4, f_5$, each frequency pulse successively delayed by one pulse width Δ. The delays shown in FIG. 14 will of course change if the order of the frequencies transmitted is changed. This configuration could be used for a system in which the frequency transmission order was fixed at the time of manufacture. Alternatively, a matrix switch can be used in front of the set of delay circuits to select which channels to delay by which amount. Pulses may be transmitted with interpulse delays different from Δ and therefore the corresponding delays will be used in this circuit, as will be evident to those skilled in the art.

Referring to FIG. 14, the intermediate signals 810 representing Re($EZ_k(t)$) and Im($EZ_k(t)$), k=0, 1, ..., N−1 are produced by the phase shifter/mixer 1204, e.g., by multiple circuits such as is shown in FIG. 13. Each of these signals is delayed 820 by the time which it was transmitted in advance of the 5th and final frequency pulse. For example, frequency 5 being the last pulse requires no delay. Frequency 1, being transmitted at a time 4Δ in advance of the frequency 5 pulse, must be delayed 820$d$ and 820$h$ by that amount. Thus, the delays 820 provide one example of the delay circuit 1206 of FIG. 12 to align the signals in time. All delayed values of the signals 810$a$ are summed 830$a$ then passed through a square law device 840$a$. All delayed values of the signals 810$b$ are summed 830$b$ then passed through a square law device 840$b$. That is, summers 830$a$ and 830$b$ provide an example of the summer 1208 of FIG. 12, while the squarers 840*a* and 840*b* provide an example of the squarer 1210 of FIG. 12. Due to $$D(t) = \sum_{k=0}^{N-1} e^{-j\omega_k t} Z_k(t)$$

from equation (8) and $EZ_k(t)=e^{-j\omega_k t}Z_k(t)$ from equation (12), the output of the summers 830*a* and 830*b* represents the real and imaginary components of the function D(t), which are labeled in FIG. 12 as Re(D(t)) and ImD(t)). The outputs of the square law devices 840 are summed 850 to produce an analog signal 860 which represents the amplitude squared of the function D(t) as defined in equations (8) and (11). In other words, the summer 850 outputs the detection signal |D(t)|². Accordingly, summer 850 is one example of the summer 1212 of FIG. 12.

Figure 15:
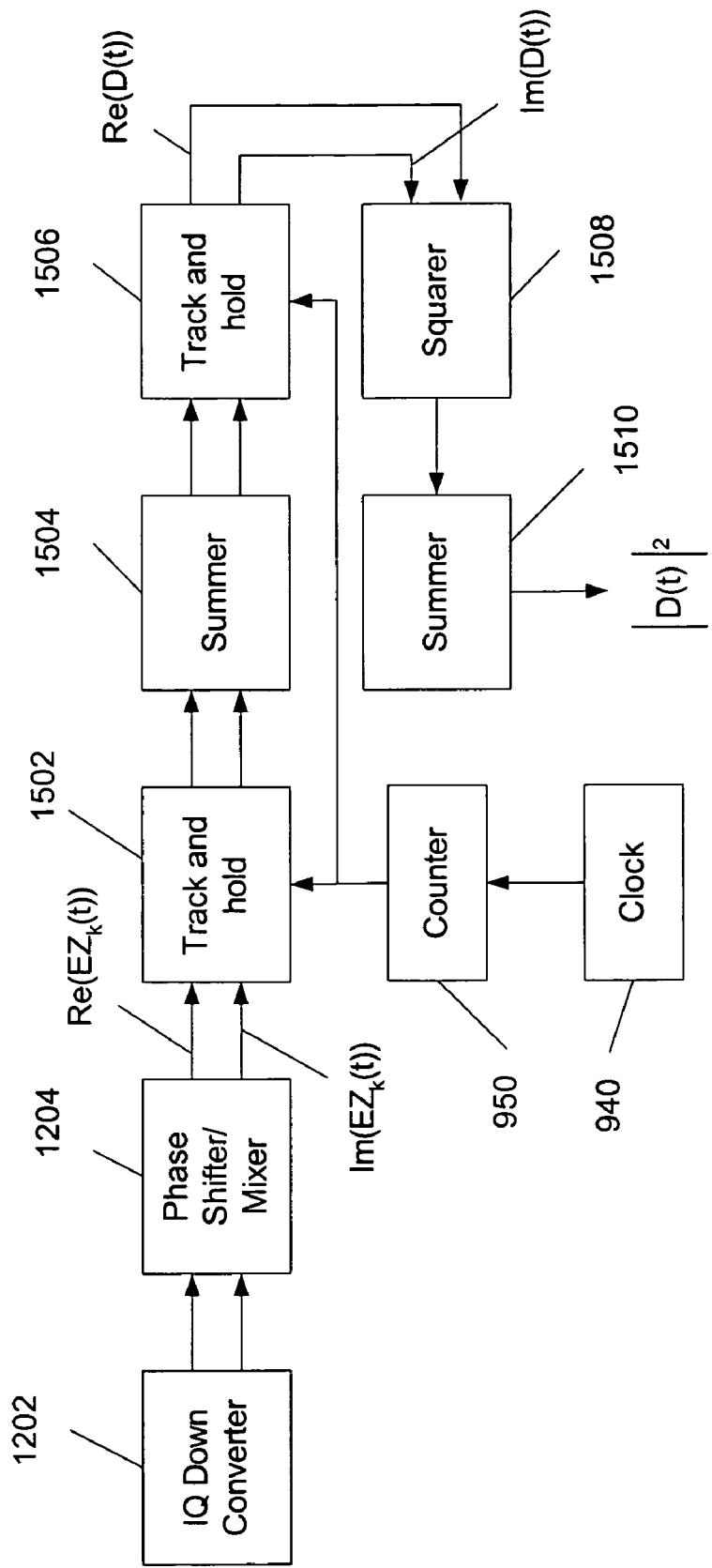
FIG. 15 is a block diagram of an analog implementation of the receiver portion of the transceiver of FIG. 3 according to another embodiment.

Referring next to FIG. 15, a block diagram is shown of an analog implementation of the receiver portion of the transceiver of FIG. 3 according to another embodiment. The IQ downconverter 1202 and the phase shifter/mixer 1204 are as described above; however, the output of the phase shifter/mixer 1204 is coupled to track and hold (T/H) circuit 1502, which is coupled to a summer 1504, which is coupled to track and hold (T/H) circuit 1506, which is coupled to a squarer 1508, and which is coupled to summer 1510, which outputs the detection signal 142, in this case, |D(t)|². In this example, the track and hold circuits 1502 and 1506 are implemented in the decoder 138 described above and serves to sample the I and Q data at selected ranges and to delay/align the signaling for the k frequency pulses; thus, the track and hold circuits 1502 and 1506 function as a sampler and a delay. The summer 1504, the squarer 1508 and the summer 1510 are implemented as the pulse compression module 140 and output the range profile or detection signal. A clock 940 and a counter 950 are coupled to the track and hold circuits 1502 and 1506. Further details of this example are described next.

Figure 16:
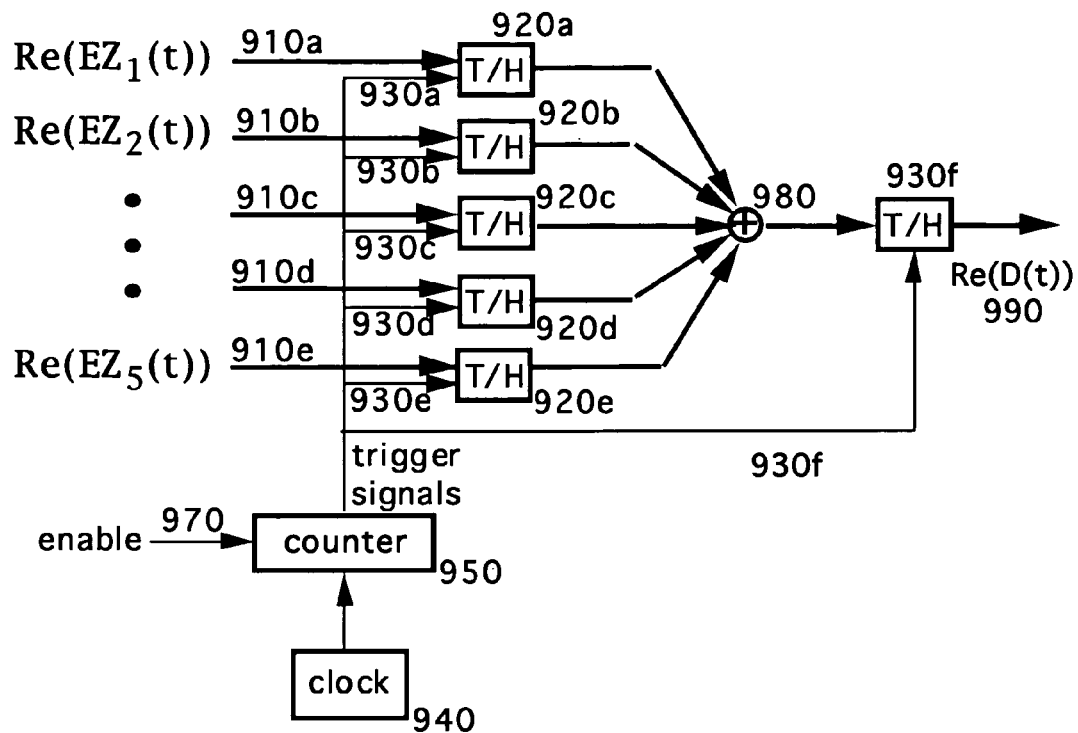
FIG. 16 shows one possible replacement for the delay and sum circuit of FIG. 15 using track and hold modules and which is software adaptable.

One alternative implementation to the delay 820 and sum 830 components shown in FIG. 14 is illustrated in FIG. 16. This alternative would be useful, for example, if the radar is to be used to check for target presence at a small number of fixed ranges. Two of the circuits shown in FIG. 16, one for each of the signals 810*a* and 810*b*, would be needed at each fixed detection range. In other words, the circuit of FIG. 16 is an alternative to the delays 820 and summer 830 for the real component Re(EZ$_k$(t)). Another similar circuit would be used for the imaginary component Im(EZ$_k$(t)). Thus, the example of FIG. 16 shows one implementation of the track and hold circuits 1502, 1506 and the summer 1504. As illustrated in FIG. 16, there is a separate track and hold circuit 920*a* through 920*e* for each analog signal that holds the signal upon receiving a delayed trigger signal 930 from the counter 950. The summer 980 sums the held values from the track and hold circuits 920. The track and hold circuit 920*f* tracks the signal output from the summer 980 and holds that signal upon receiving a delayed trigger signal 930*f* from the counter 950 at a point in time after all previous sample and hold circuits 920*a* through 920*e* have been triggered. Thus, output 990 is the real component of the function D(t), i.e., Re(D(t)), and is squared and summed with the squared output of a corresponding circuit for the imaginary components Im(EZ$_k$(t)) which produces the imaginary component of the function D(t), i.e., Im(D(t)), to produce a sampled detection signal |D(t)|². This is best illustrated in FIG. 15 where the output of the track and hold 1506 comprises Re(D(t)) and Im(D(t)), which are each squared by squarer 1508 then summed at summer 1510 to produce |D(t)|². An advantage of the use of the circuit in FIG. 16 is that the order of transmission of frequencies can be adaptively reconfigured in the field by software in the radar sensor.

Referring to FIG. 16, the intermediate voltage signals 910 representing Re(EZ$_k$(t)), k=0, 1, . . . , N−1 are each input to a track and hold circuit 920. These circuits each follow the corresponding signal 910 until a trigger signal 930 is detected, at which time the present value of this signal is held.

Figure 17:
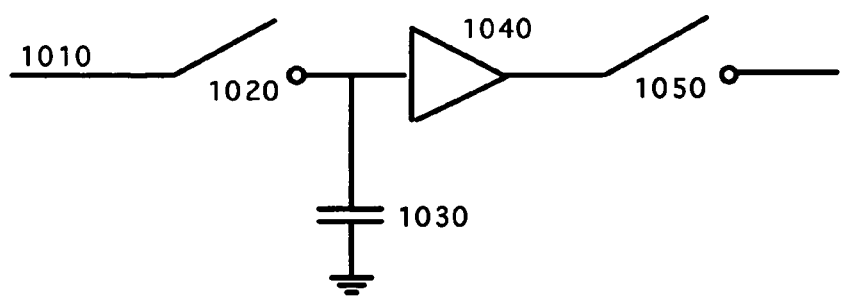
FIG. 17 describes how a basic track and hold circuit is operated within the circuit described in FIG. 16.

FIG. 17 illustrates an example of a track and hold circuit which can be used to follow an analog voltage 1010 until the switch 1020 is closed in response to a trigger signal 930, at which time the capacitor 1030 acts to hold the voltage value fixed. A buffer amplifier 1040 is used to prevent decay of voltage in the capacitor. Upon receipt of a second trigger 930, switch 1050 makes the voltage across the capacitor available at the output of the device. In the circuit described in FIG. 16, the switch 1050 is actually not required and could be eliminated.

Referring again to FIG. 16, the signals 910 are captured in the same order in which they were transmitted, the T/H circuits 920 being triggered at time intervals corresponding to the delays between pulses upon transmission. For the example as above in which pulses are transmitted in the order $f_1, f_2, f_3, f_4, f_5$, with each successive pulse delayed by one pulsewidth Δ, the trigger times would occur at t for 930*a*, (t+Δ) for 930*b*, (t+2Δ) for 930*c*, (t+3Δ) for 930*d*, and (t+4Δ) for 930*e*.

An external enable signal 970 is used to initiate this sampling process. The first rising edge of clock causes the trigger signal 930*a* to activate the T/H 920*a*. This defines the initial sample time t. Successive trigger signal delays are computed by the counter 950. The architecture as shown supports only sampling values and delays which are at fixed multiples of the period of the clock 940. That is, the trigger times t, (t+Δ), . . . , (t+4Δ) would coincide with a rising or falling edge of a clock pulse. When T/H 920*e* is activated, the total sum of the values of the delayed signals 910 is present at the output of the summer 980. At any chosen time after (t+4Δ), the trigger signal 930*f* would be sent to the last T/H 920*f* to capture the sum 990.

As is evident to those skilled in the art, the multiple frequency pulses may be transmitted with interpulse delays different from Δ and therefore the corresponding delays would be used in this circuit. It is evident that these delays are not restricted to multiples of the clock period, since additional analog delay circuitry may be added to support virtually any combination of delays.

A typical operation in detection radars is the coherent addition of M successive returns from multiple transmitted pulses, in order to improve the signal to noise ratio. If the PRF is high, then a common problem with conventional radars is for previously transmitted pulses to return clutter from longer ranges while receiving the last transmitted pulse.

A similar problem could occur with sufficiently high PRF with UWB radars. Using a coding scheme which tends to randomize the order of the transmitted symbols will reduce this problem of aliased range returns, since successive aliased returns at each frequency will be due to reflections from different range bins and thus will combine coherently in such as manner as to reduce the aliased clutter returns.

This approach will provide addition of aliased range returns from N different ranges, where N is the number of frequencies transmitted. Spacing the transmission of these frequencies further apart will tend to decorrelate the clutter in those range returns. Another way of obtaining addition of different range returns is to randomize the pulse repetition interval PRI. Since UWB pulse trains typically employ a very low duty ratio, this can provide many more ranges for the coherent addition—up to the number of integrated pulses M.

Figure 18:
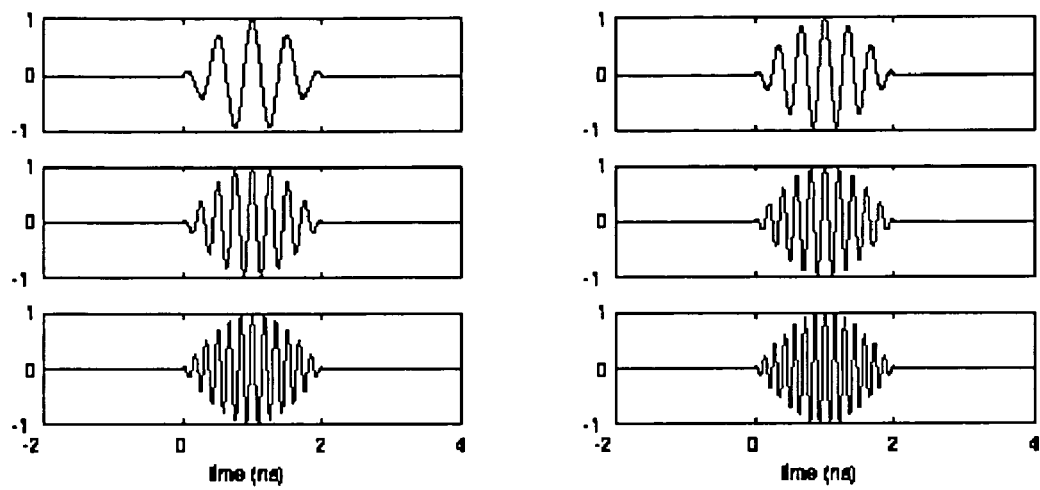
FIG. 18 illustrates shaped pulses of length $\Delta=2$ ns for frequencies $f_k=1$ to 3.5 GHz in steps of 500 MHz.

Referring to FIG. 6, it is very difficult in practice to achieve rectangular envelope sine pulses 156 as shown. If instead, shaped individual pulses are used, the method still provides satisfactory pulse compression. As an example, consider a gating circuit 154 which produces shaped pulses of the form $$\chi_{[0,\Delta]}(t)\sin\left(\frac{\pi t}{\Delta}\right)\cos(\omega_k t)$$

where $\Delta$ is the pulse length, rather than $\chi_{[0,\Delta]}(t)\cos(\omega_k t)$. Note as before that this defines the time axis so that $t=0$ represents the time just as this pulse is leaving the transmitter. FIG. 18 illustrates pulses of length $\Delta=2$ ns, shaped according to the above expression, for frequencies $f_k=1$ to 3.5 GHz in steps of 500 MHz.

The signal returned from the range $$R = \frac{c\tau}{2}$$

for a transmitted pulse with frequency $f_k$ as shown in FIG. 18 is given by $$A(\tau)\cos(\omega_k(t-\tau))\sin\left(\frac{\pi(t-\tau)}{\Delta}\right)\chi_{[0,\Delta]}(t-\tau) = \quad (13)$$

$$A(\tau)\sin\left(\frac{\pi(t-\tau)}{\Delta}\right)(\cos(\omega_k t)\cos(\omega_k \tau) + \sin(\omega_k t)\sin(\omega_k \tau))\chi_{[0,\Delta]}(t-\tau)$$

where $A(\tau)$ represents both reflection from scatterer(s) at the range R and atmospheric and range attenuation. Receiving this with the circuit shown in FIG. 7 gives I and Q values of $$I_k(t) = \int_{t-\Delta}^{t} A(\tau)\sin\left(\frac{\pi(s-\tau)}{\Delta}\right)\cos(\omega_k s)(\cos(\omega_k s)\cos(\omega_k \tau) + \quad (14)$$

$$\sin(\omega_k s)\sin(\omega_k \tau))\chi_{[0,\Delta]}(s-\tau)ds$$

$$= A(\tau)\int_{-\infty}^{\infty}\sin\left(\frac{\pi(s-\tau)}{\Delta}\right)\left(\left(\frac{1}{2}+\frac{1}{2}\cos(2\omega_k s)\right)\cos(\omega_k \tau) + \frac{1}{2}\sin(2\omega_k s)\sin(\omega_k \tau)\right)\chi_{[\tau,\tau+\Delta]}(s)\chi_{[t-\Delta,t]}(s)ds$$

$$= \frac{A(\tau)}{2}\left[\cos(\omega_k \tau)\int_{\max(t-\Delta,\tau)}^{\min(t,\tau+\Delta)}\sin\left(\frac{\pi(s-\tau)}{\Delta}\right)ds + \right.$$

$$\cos(\omega_k \tau)\int_{\max(t-\Delta,\tau)}^{\min(t,\tau+\Delta)}\sin\left(\frac{\pi(s-\tau)}{\Delta}\right)\cos(2\omega_k s)ds +$$

$$\left.\sin(\omega_k \tau)\int_{\max(t-\Delta,\tau)}^{\min(t,\tau+\Delta)}\sin\left(\frac{\pi(s-\tau)}{\Delta}\right)\sin(2\omega_k s)ds\right]\chi_{[\tau,\tau+2\Delta]}(t)$$

$$= \frac{A(\tau)}{2}\left[\cos(\omega_k \tau)\int_{\max(t-\Delta,\tau)}^{\min(t,\tau+\Delta)}\sin\left(\frac{\pi(s-\tau)}{\Delta}\right)ds + \right.$$

-continued $$\left.\int_{\max(t-\Delta,\tau)}^{\min(t,\tau+\Delta)}\sin\left(\frac{\pi(s-\tau)}{\Delta}\right)\cos(2\omega_k \tau - 2\omega_k s)ds\right]\chi_{[\tau,\tau+2\Delta]}(t)$$

$$\approx \frac{A(\tau)\cos(\omega_k \tau)}{2}\left[\int_{\max(t-\Delta,\tau)}^{\min(t,\tau+\Delta)}\sin\left(\frac{\pi(s-\tau)}{\Delta}\right)ds\right]\chi_{[\tau,\tau+2\Delta]}(t)$$

$$= \frac{A(\tau)\cos(\omega_k \tau)}{2}\left[\frac{-\Delta}{\pi}(\cos(\pi(m_{up}(t,\tau)-\tau)/\Delta) - \cos(\pi(m_{low}(t,\tau)-\tau)/\Delta))\right]\chi_{[\tau,\tau+2\Delta]}(t)$$

where $m_{up}(t, \tau)$, $m_{low}(t, \tau)$ are defined as before, and the integral is 0 if $m_{up}(t, \tau)<m_{low}(t, \tau)$. This can be rewritten as $$I_k(t) = A(\tau)\frac{\Delta}{2}\cos(\omega_k \tau)bump(t-\tau)$$

and similarly $$Q_k(t) = A(\tau)\frac{\Delta}{2}\cos(\omega_k \tau)bump(t-\tau)$$

where $$bump(\tau) = -\frac{1}{\pi}(\cos(\pi\min(\tau,\Delta)/\Delta) - \cos(\pi\max(\tau-\Delta,0)/\Delta))$$

Figure 19:
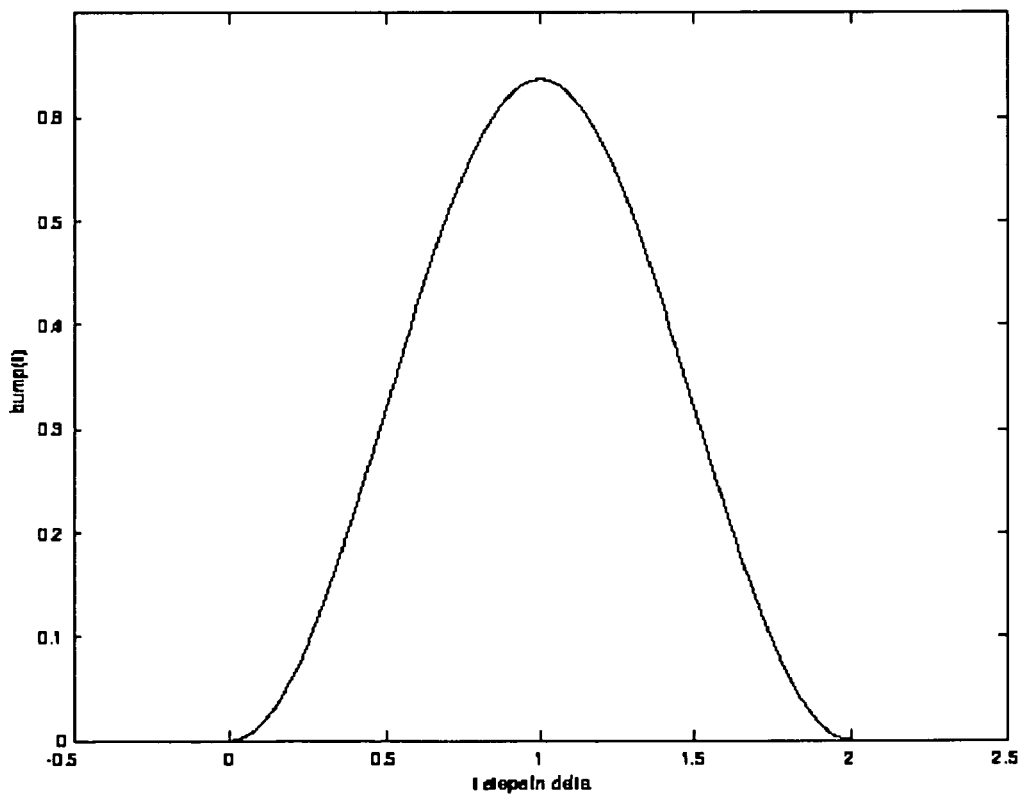
FIG. 19 illustrates the function bump(t).

The function $bump(\tau)$ is shown in FIG. 19 for comparison with the function $TRI(\tau)$ shown in FIG. 8. The peak value of this function is achieved at $t=\Delta$ and the function is exactly 0 outside the interval $[0,2\Delta]$. The calculation for Q is similar to that for I.

Figure 20:
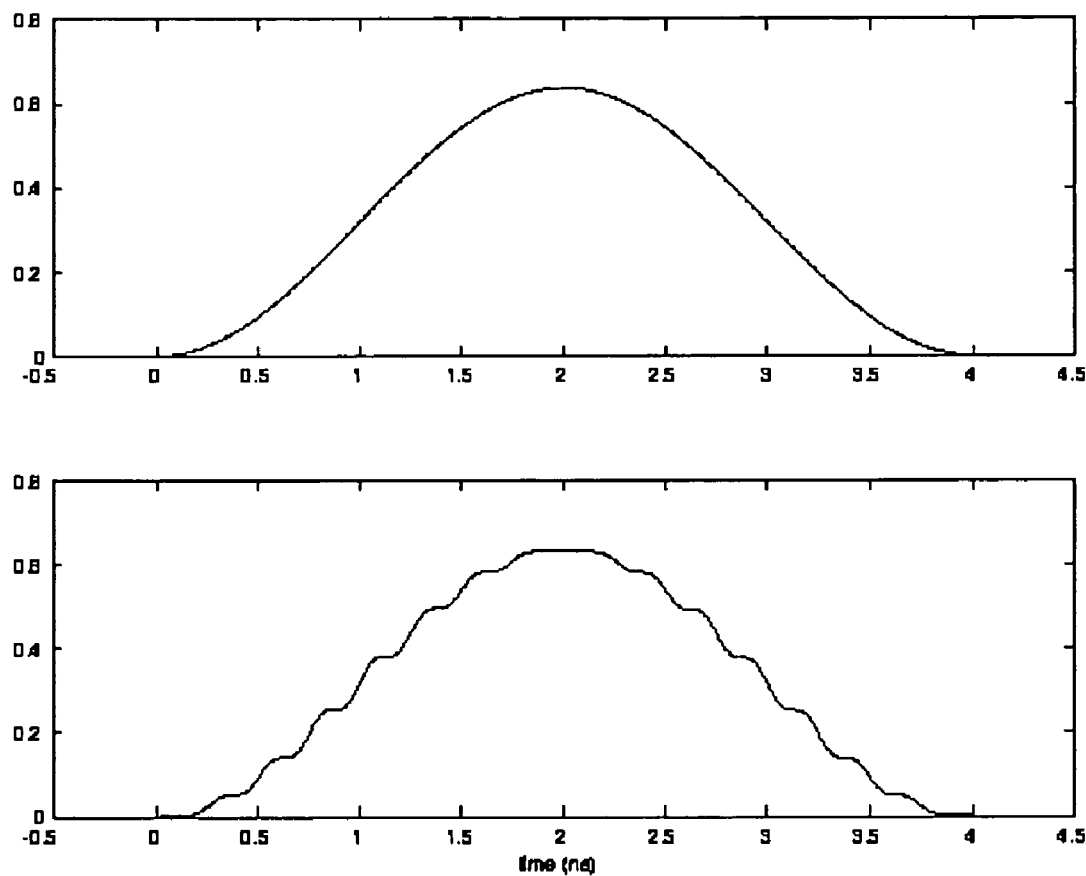
FIG. 20 shows the difference between the approximation for the function $I_k(t)$ and the exact value.

The term which was neglected in equation 11 provides a perturbation of a few percent on the function $bump(\tau)$ and the size of this perturbation gets increasingly smaller as the center frequency of transmitted pulse increases. Referring to FIG. 20, for example, the bottom half of the figure shows the function $I_k(t)$ multiplied by $2/\Delta$ for a center frequency=2 GHz, where it assumed that $\tau$ is chosen so that $A(\tau)=\cos(\omega_k \tau)=1$. The top half of the figure represents the approximation obtained by neglecting the small term. This is the same as the function $bump(\tau)$.

The signal which represents reflections from all ranges $\tau$ of a transmitted pulse of length $\Delta$ centered at frequency $f_k$ can be represented by $$I_k(t) = \int_{-\infty}^{\infty} A(\tau)\frac{\Delta}{2}\cos(\omega_k \tau)bump(t-\tau)d\tau \quad (15)$$

$$Q_k(t) = \int_{-\infty}^{\infty} A(\tau)\frac{\Delta}{2}\sin(\omega_k \tau)bump(t-\tau)d\tau$$

Note that this takes the form of a convolution with convolution kernel equal to bump(t−τ). Also note that the amplitude returned from a range $$R = \frac{c\tau}{2}$$

is multiplied by $\cos(\omega_k\tau)$ or $\sin(\omega_k\tau)$.

By using the sum of the individual frequency I and Q signals for multiple transmitted frequency pulses whose phase angles have been rotated so as to align, a signal which represents the reflected radar return with a resolution proportional to the inverse of the cumulative bandwidth of these pulses can be constructed. Let $\omega_k=\omega_0+k(\delta\omega)$, $k=1, 2, \ldots,$ N−1 represent the radian frequencies, i.e. $\omega_k=2\pi f_k$, of N transmitted pulses of pulse width Δ. Define $$Z_k(t) = I_k(t) + jQ_k(t) = \frac{\Delta}{2}\int_{-\infty}^{\infty} A(\tau)e^{j\omega_k\tau}\text{bump}(t-\tau)d\tau, \quad (16)$$

where $j=\sqrt{-1}$ and define one form of a detection signal 142 as the complex function D(t) defined as $$D(t) = \sum_{k=0}^{N-1} e^{-j\omega_k t} Z_k(t) \quad (17)$$

At any fixed time t, D(t) can be computed by the the Discrete Fourier Transform of the sequence $\{Z_k(t)\}_{k=0}^{N-1}$. Then $$\begin{aligned}D(t) &= \frac{\Delta}{2}\int_{-\infty}^{\infty} A(\tau)\sum_{k=0}^{N-1} e^{j\omega_k(\tau-t)}\text{bump}(t-\tau)d\tau \\ &= \frac{\Delta}{2}\int_{-\infty}^{\infty} A(\tau)e^{j\omega_0(\tau-t)}\sum_{k=0}^{N-1}(e^{j\delta\omega(\tau-t)})^k \text{bump}(t-\tau)d\tau \\ &= \frac{\Delta}{2}\int_{-\infty}^{\infty} A(\tau)e^{j\omega_0(\tau-t)}e^{j\delta\omega(\tau-t)(N-1)/2}\left(\frac{\sin(\delta\omega(\tau-t)N/2)}{\sin(\delta\omega(\tau-t)/2)}\right)\text{bump}(t-\tau)d\tau\end{aligned} \quad (18)$$

Define the convolution kernel $K_b$ by $$K_b(\tau) = e^{-j\omega_0\tau}e^{-j\delta\omega\tau(N-1)/2}\left(\frac{\sin(\delta\omega\tau N/2)}{\sin(\delta\omega\tau/2)}\right)\text{bump}(\tau) \quad (19)$$

then, in preferred form, an alternate detection signal 142 can be expressed as the squared amplitude of the complex function D(t), i.e., $|D(t)|^2$ where D(t) can be seen to be $$D(t) = \frac{\Delta}{2}\int_{-\infty}^{\infty} A(\tau)K_b(t-\tau)d\tau \quad (20)$$

Figure 21:
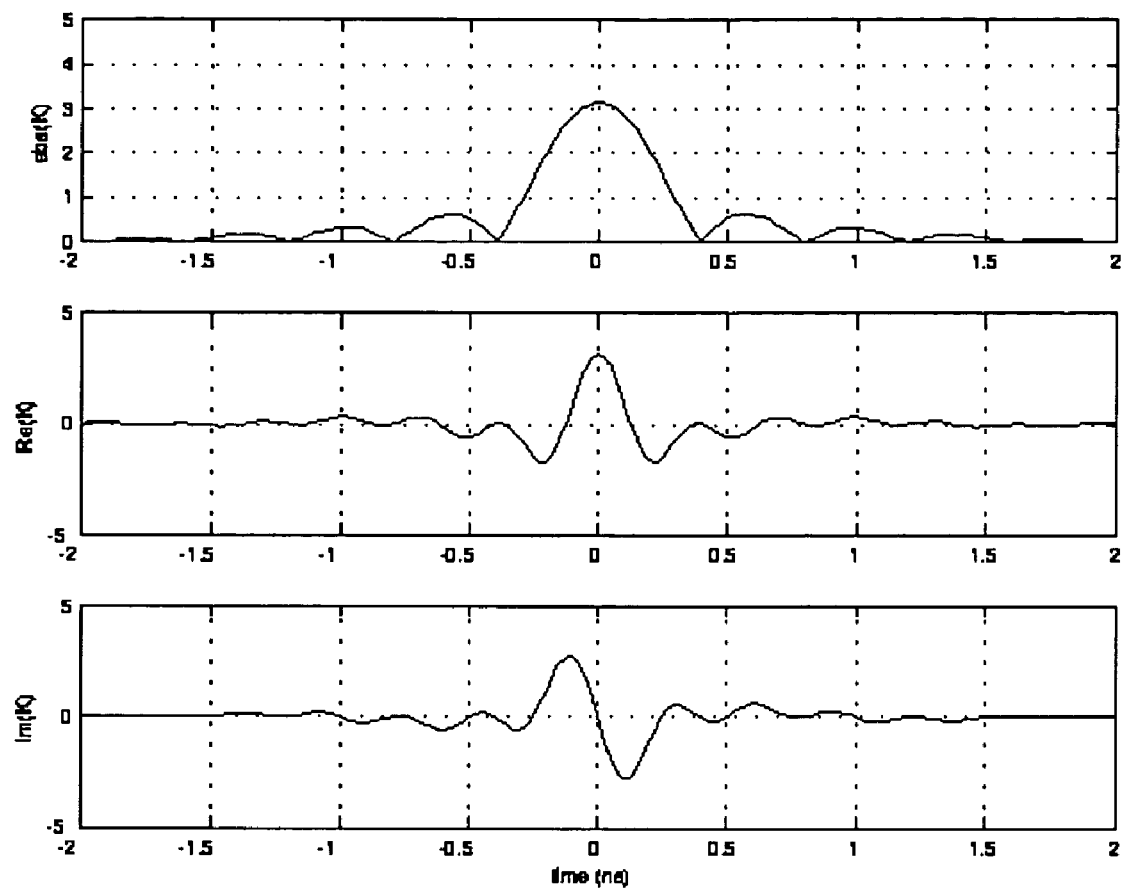
FIG. 21 shows the equivalent compressed pulse from a UWB multi-band radar having 5 frequencies separated by 500 MHz each, for a 2 GHz total bandwidth, when the pulses are shaped by a half sine function.

That is, the radar resolution is defined by the kernel $K_b$. It is noted that the expression of D(t) in equation (20) is equivalent to the expression of D(t) in equation (17). FIG. 21 shows an example of the amplitude, real part, and imaginary part of the convolution kernel $K_b$ for the case when $f_0=1$ GHz with 5 frequency steps of $\delta f=500$ MHz, each pulse of width 2 ns, for a total bandwidth of 2 GHz. Thus, in preferred form, the range profile or detection signal $|D(t)|^2$ represents returned power versus range, or equivalently, time delay. It is noted that in other embodiments, the function D(t) is the detection signal, e.g., in embodiments where Doppler calculations are needed.

There are a number of standard methods used with conventional pulse compression radars to improve various measures of performance. Such methods are also applicable to pulse compression using UWB waveforms. For example, application of amplitude windows such as the raised cosine, hamming, hanning, and so on, such as described by F. J. Harris, "On the Use of Windows for Harmonic Analysis with the Discrete Fourier Transform", Proceedings of IEEE, January 1978, pgs. 51–83, can be used to suppress the sidelobes of the compressed pulse at the expense of slightly degraded pulse width, i.e. resolution.

Figure 22:
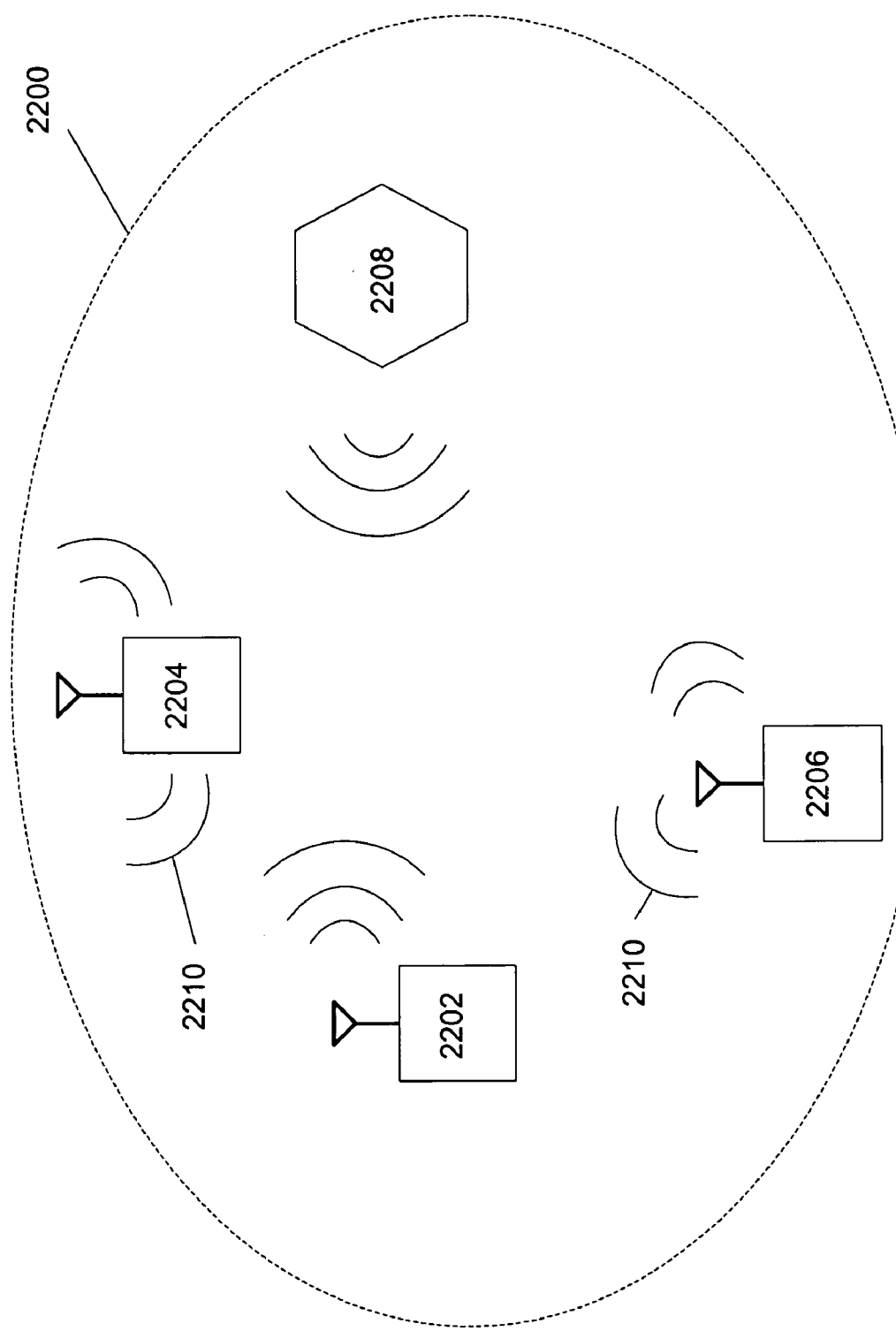
FIG. 22 is a diagram of a sensor network using multiple radar devices, such as the radar transceiver of FIG. 3, in proximity to each other.

Referring next to FIG. 22, a diagram is shown of a sensor network 2200 (or sensor net) using multiple radar devices 2202, 2204, 2206 (also referred to as sensors), such as the radar transceiver of FIG. 3, in proximity to each other. As illustrated, all of radar devices 2202, 2204, 2206 transmit radar signaling, such as described above, to image a target 2208. However, due to their close proximity to each other, the radar signaling or radar pulses from other radar devices causes interference (illustrated as 2210). Additionally, a given radar device likely receives pulse reflections of signals transmitted by other radar devices as well as reflections of its own transmitted signals. Thus, according to several embodiments of the invention, coded radar pulses are transmitted which allow a given radar device to be able to improve the signal-to-interference ratio for returns from its own transmitted signals. Thus, a given radar device is able to operate effectively in the presence of a sensor network or other sources of ultra wideband or narrowband interference. The information encoded on these pulses can also form the basis for communications simultaneous with the radar transmission. For example, in the network 2200 of radar sensor devices, communication and cooperation between multiple sensor devices in a networked field of sensors can improve significantly on the ability of a single device to detect intrusions into the sensor field.

Figure 23:
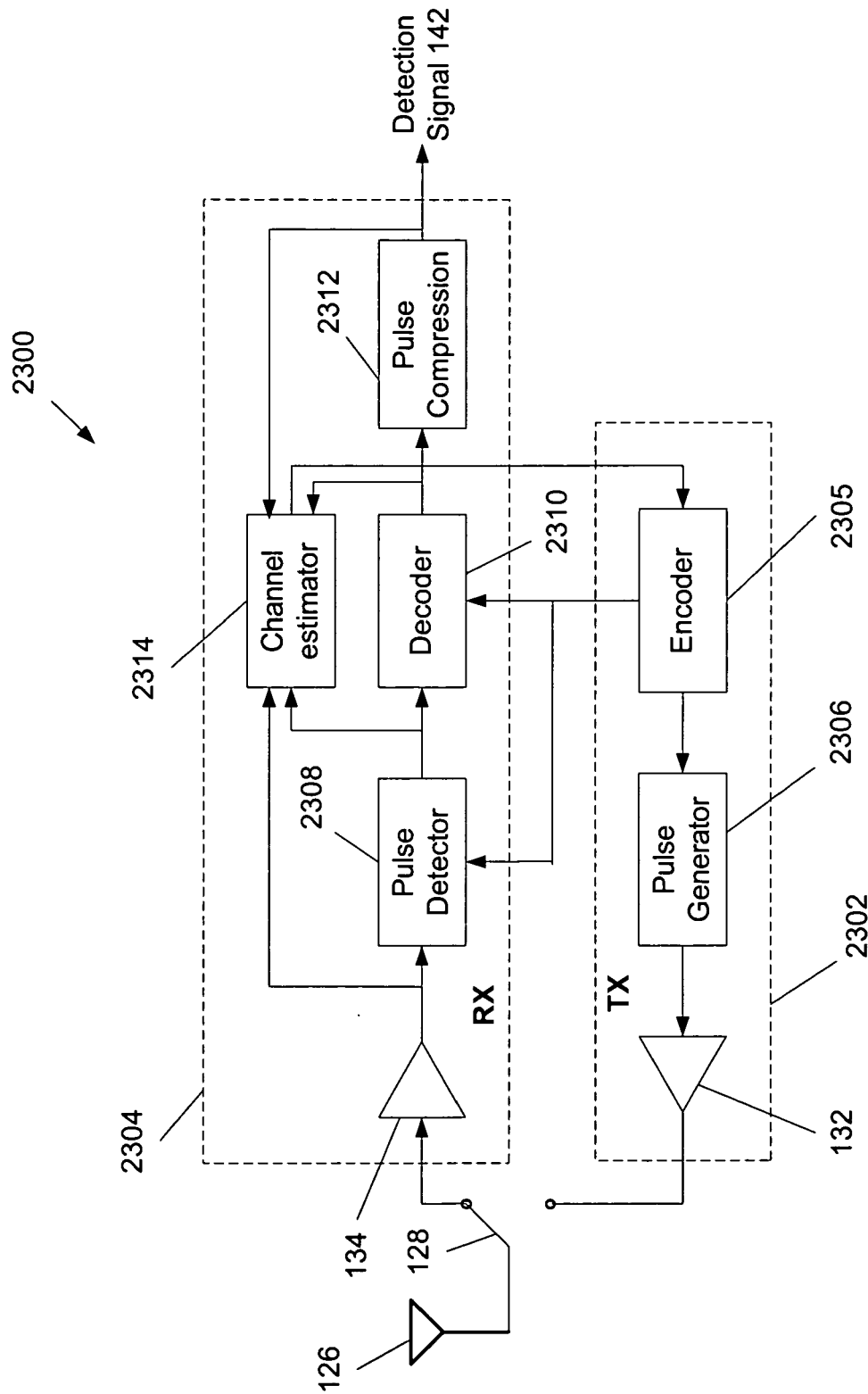
FIG. 23 is a block diagram of a variation of the radar transceiver device of FIG. 3 using encoded radar pulses in the presence of other collocated radar devices, for example, in the sensor network of FIG. 22, and also capable of altering the coding of the radar pulses based on detected conditions at the receiver portion and/or codes used by other transceiver devices in accordance with other embodiments of the invention.

Referring next to FIG. 23, a block diagram is shown of a variation of the radar transceiver device of FIG. 3 using encoded radar pulses in the presence of other collocated radar devices, for example, in the sensor network 2200 of FIG. 22, and also capable of altering the coding of the radar pulses based on detected conditions at the receiver portion and/or codes used by other transceiver devices in accordance with other embodiments of the invention. Similar to the device 120 of FIG. 3, the radar device 2300 includes a transmitter portion 2302 (also referred to as a transmitter) and a receiver portion 2304 (also referred to as a receiver, and which also may be implemented as a matched filter) connected to the antenna 126 using the Transmit/Receive (T/R) switch 128. The transmitter portion includes an encoder 2305 coupled to a pulse generator 2306 (also referred to as a burst generator) and the optional power amplifier 132. The receiver portion 2304 includes the optional low noise amplifier (LNA) 134, a pulse detector 2308 (also referred to as a burst detector), a decoder 2310 and a pulse compression module 2312, which outputs the detection signal 142. However, in these embodiments, the receiver portion 2304 also includes a channel estimator 2314 (also referred to as a channel detector) which can input one or more of the outputs of the LNA 134, the pulse detector 2308, the decoder 2310, and the pulse compression module 2312 and has an output back to the encoder 2305 of the transmitter portion 2302.

In one embodiment, in order to better operate in the presence of other radar devices in a network, the pulse generator generates and transmits the sequence of pulses comprising the radar waveform according to a defined frequency and time sequence. Again, as described above, preferably all of the pulses in the waveform have a time duration shorter than the expected range delay extent of the target 2208. For example, in a system generating 3 pulses that have a time duration shorter than the expected range delay extent of the target 2208, each having a different center frequency (e.g., f1, f2 and f3) and each transmitted in a different time slot, one frequency and time sequence may comprise sending a pulse at f2, then a pulse at f3, then a pulse at f1. The receiver portion 2304 operates on the reflected pulse return, and synthesizes from it a range profile as described above. In this embodiment, the receiver portion 2304 performs a matched filter-like process to reject other frequency and time sequence signals that may be received.

For example, in preferred form, the energy is combined from the multiple frequencies as described in the pulse compression process. However, the order of frequencies provides a means of rejecting alternate orders (frequency and time sequences) via what is essentially a matched filter process. The frequency and time sequence of the transmitted waveform is communicated to the receiver 2304 via signaling from the encoder 2305. The pulse detector 2308, decoder 2310, and pulse compression 2312 provide the functionality of the matched filter and serve to boost the signal to noise and interference ratio (SNIR) of received signal samples corresponding to the transmitted waveform having the transmitted frequency and time sequence and suppress noise and interference components in the received waveform. Accordingly, the receiver 2304 functions as a matched filter to optimize the reception of the transmitted waveform; thus, effectively, filtering out noise and other interfering sources, including other radar devices in a shared network and providing for optimum reception of the transmitted waveform in the presence of other collocated radar transmitting devices. This is similar to a communication which uses coding gain to improve reception. It is noted that as the number of different pulses having different frequencies used is increased, the interference rejection is improved.

Additionally, in preferred form, the defined frequency and time sequence of the transmitted signaling for the radar device 2300 is selected to be different than the frequency and time sequence to be used for other collocated radar devices in the same network 2200. Such can be accomplished through preprogramming the encoder 2305 of each radar device, through communication between radar sensing devices within the network, or through adaptive selection based on information detected in use. In some embodiments, the defined frequency and time sequence of a given radar device is selected to be substantially orthogonal to the frequency and time sequences of other radar transmitting devices in the same network.

In another embodiment, the channel estimator 2314 is used to take measurements of the channel conditions or detect channel conditions, which are used to alter the frequency and time sequence of pulses transmitted by the transmitter portion 2302 if needed. For example, the channel estimator 2314 may compute the received signal strength in each frequency sub-band or an overall signal to noise ratio of the detection signal. For example, such measurements may indicate whether there is an interfering source in one or more sub-bands or whether the selected frequency and time sequence is not optimal or is being used by another radar device in the network.

If the channel estimator 2314 uses the inputs directly from the LNA 134, from the pulse detector 2308 or from the decoder 2310, the channel estimator can take measurements specific to a given frequency sub-band. If the channel estimator uses the output of the pulse compression module 2312, measurements relating to the overall waveform or cluster of pulses is obtained. Thus, it can be determined if there is a strong interferer in a particular sub-band, or if the conditions for a particular encoded sequence (i.e., a particular frequency and time sequence of pulses) of pulses is not optimal, possibly indicating that another radar device is using that particular encoded sequence.

Accordingly, the measurements taken in the channel estimator 2314 are output to the encoder 2305, which decides whether the frequency and time sequence of pulses should be changed or not. In one embodiment, the frequency and time sequence of pulses transmitted from the transmitter portion 2302 is varied based on detected channel conditions. It is noted that in other embodiments, the frequency and time sequence of pulses that make up a given radar cluster or waveform may be varied according to a predefined or random order, with or without any feedback or channel measurements or other information gathered about the received signaling.

Generally, as far as the radar processing of the received signals, the operation of the receiver portion 2304 is similar to that described above. That is, reflections of the transmitted waveform are received at the antenna 126 and routed to the receiver 2304 by the switch 128. The reflections are optionally amplified (as needed) by the LNA 134 and input to the pulse detector 2308. The pulse detector detects the presence of received pulses and outputs baseband I and Q data to the decoder 2310, which (for purposes of radar processing) acts as a sampler to sample the I and Q data at selected ranges and/or delay or align the sampled data. Specifically, for each detected pulse, the pulse detector includes a complex mixer or IQ downconverter that generates I and Q data, which is sampled and aligned by the decoder 2310 (see, for example, FIGS. 10–17). Next, the pulse compression module 2312 performs pulse compression on the received pulse reflections and generates the detection signal 142, for example, $D(t)$ or $|D(t)|^2$ as described above, which represents the range profile. Advantageously, the detection signal has a radar resolution based on the inverse of the total bandwidth of the transmitted signaling, (e.g., $B_{UWB}$) rather than based on the inverse of the bandwidth of any given pulse (e.g., $B_{sub}$).

Thus, in contrast to known radar systems that use pulse compression techniques on narrowband pulses which have duration longer than the expected range delay extent of the target, several embodiments of the invention apply pulse compression techniques to pulses where the time duration is less than the expected range delay extent of the target. Pulse compression techniques are typically performed in radar systems using narrowband pulses (such as stepped or hopped frequency radars) because the reflected signaling represents a sampled frequency response; however, this is not the case when the duration of the pulses is shorter than the expected range delay extent of the target. Furthermore, in contrast to known impulse UWB radar systems for which pulse compression techniques are not applicable, pulse compression techniques are utilized.

Figure 24:
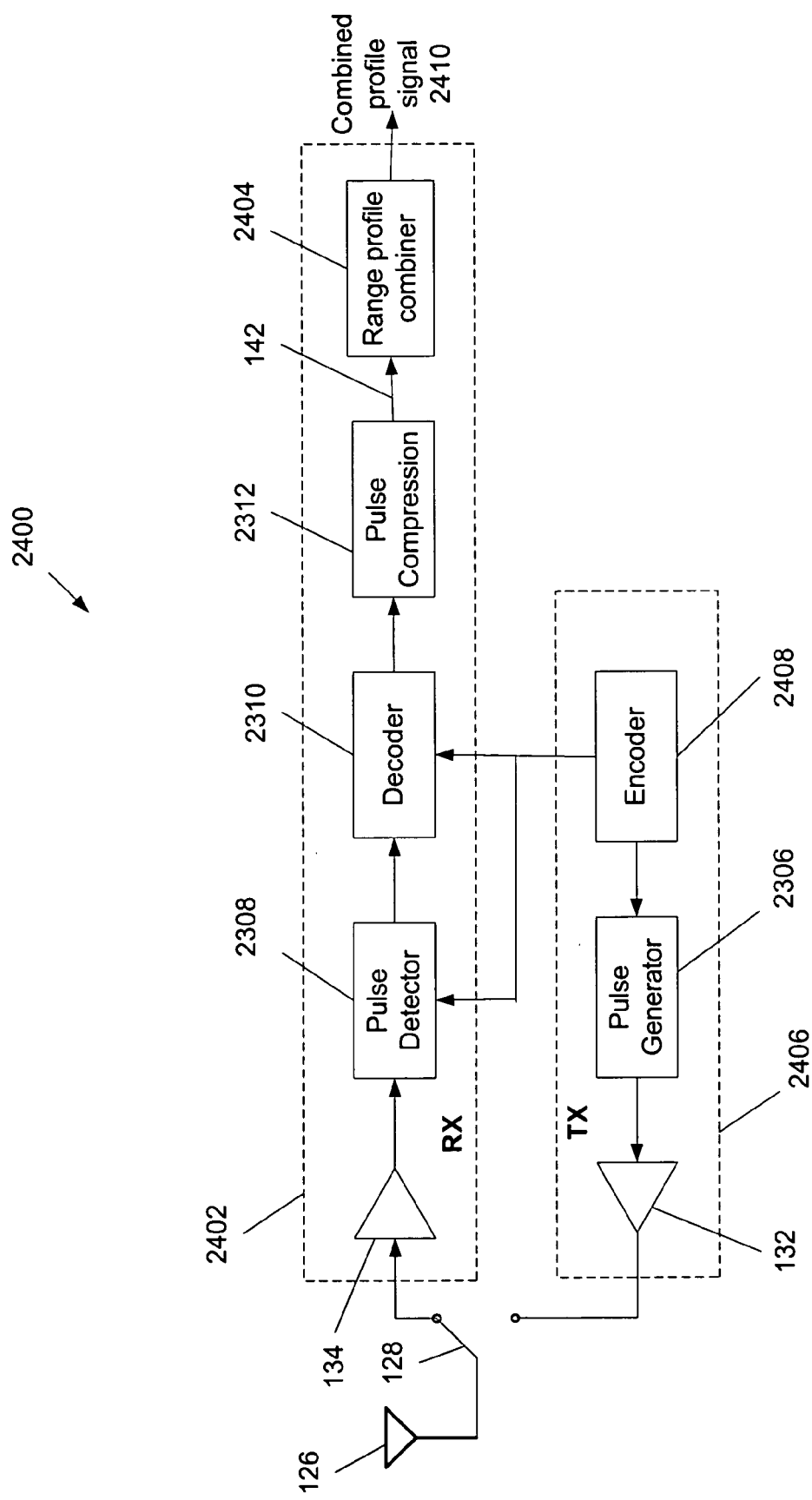
FIG. 24 is a block diagram of a variation of the radar transceiver device of FIG. 3 which reduces aliasing by using the detection signals from multiple sets of radar return signals in accordance with further embodiments of the invention.

Referring next to FIG. 24, a block diagram is shown of a radar transceiver device 2400 which reduces aliasing when using the detection signals from multiple sets of radar return signals in accordance with further embodiments of the invention. In this embodiment, the receiver portion 2402 does not require a channel estimator and includes a range profile combiner 2404 that will sum or average range profile signals or detection signals over several sets of received pulse reflections in order to reduce aliasing.

Aliasing of range returns is a well known problem where multiple returns from the same transmitted pulse are received. This happens when a pulse train is transmitted and received. A sequence of pulses or a pulse train can be transmitted for a number of reasons—one is to get a continuous sequence of radar returns for tracking purposes. Another is to average multiple returns from a single target to increase the signal to noise ratio. The problem of range aliasing occurs because while trying to receive the returns from pulse k, reflected energy from pulse k−1 can arrive after being reflected at longer ranges. This is not really a problem if there is no clutter, since the returns from pulse k−1 have essentially no energy content. But when clutter is present, the energy returned from pulse k−1 can be significant because at the farther range where this reflection takes place, the increasing beamwidth means that significant clutter can be illuminated.

In accordance with one embodiment, in order to reduce this problem, the frequency and time sequence for each transmitted cluster of pulses that comprise a radar waveform is varied by the encoder 2408 of the transmitter portion 2406 in a predetermined or random order. For example, in a system having three frequency sub-band pulses f1, f2 and f3, a first cluster of pulses is sent in the order f1, f2, f3, the second cluster is sent f3, f2, f1, the third cluster is sent f2, f1, f3, and so on. Varying the frequency and time sequence on a per cluster basis is easily performed by the encoder 2408 or trigger generator of the transmitter portion 2406. In this manner, clutter return will average out if the application is averaging to increase SNR. If used for the tracking problem, the matched filter property of the pulse compression process tends to reject the interference from the aliased range return. It is noted that the frequency and time sequence may be completely randomized or randomized between orthogonal sets of frequency and time sequences.

At the receiver side, since the varying frequency and time sequence for each cluster is communicated to the pulse detector 2308 and the decoder 2310, the received cluster is detected and processed. The range profile combiner 2404 then combines the output range profile or detection signal 142, e.g., D(t) or $|D(t)|^2$, constructed for each received cluster return to produce a combined profile signal 2410. For example, in one embodiment, the detection signals are cumulated, while in another embodiment, the detection signals are averaged. Over time, this technique provides an accurate detection signal (combine profile signal 2410) that has little degradation due to aliasing. It is noted that the signal 2410 may take the form of $\Sigma |D(t)|^2$ or $(\Sigma D(t))^2$ depending on whether the detection signal 142 is $|D(t)|^2$ or $D(t)$ respectively. It is also noted that in the preferred implementation, the combining could occur just before the squaring operation of the pulse compression module 2312, which would improve the SNR of the detection signals combined over multiple sets of received pulse waveforms. Thus, in some embodiments, the functionality of the range profile combiner occurs within the pulse compression module 2312 such that the output of the pulse compression module 2312 becomes the combined profile signal 2410.

Figure 25:
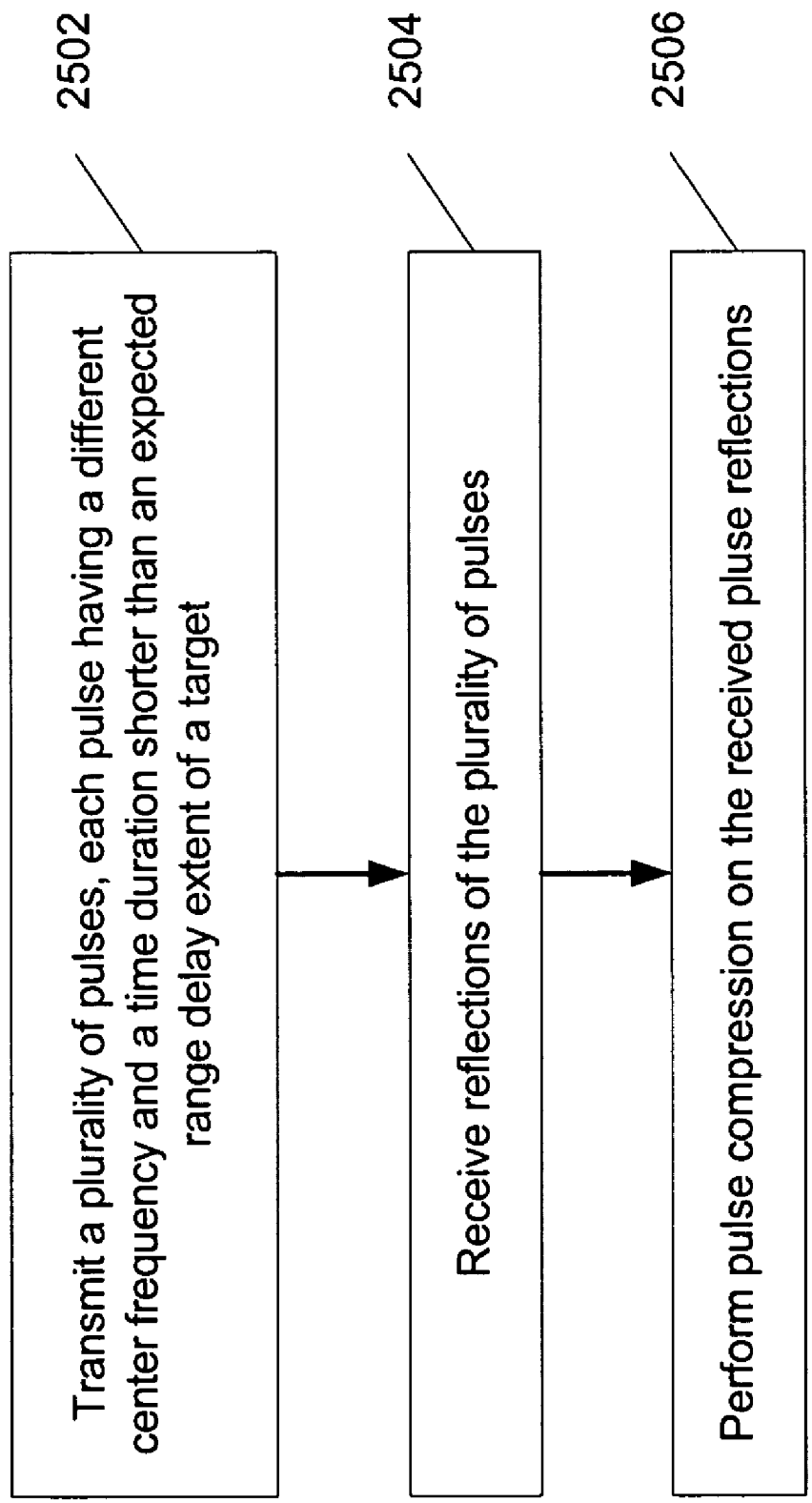
FIG. 25 is a flowchart of the steps performed in a radar technique in accordance with several embodiments of the invention.

Referring next to FIG. 25, a flowchart is shown of the steps performed in a radar technique in accordance with several embodiments of the invention. Initially, a plurality of pulses are transmitted as a radar waveform, each pulse having a different center frequency and a time duration shorter than an expected range delay extent of a target (Step 2502). These pulses may be transmitted by any of the transmitter structures described herein or other capable devices. Generally, a total bandwidth of the radar waveform is defined by a bandwidth occupied by the plurality of pulses. Preferably, these pulses are transmitted according to a known frequency and time sequence. In preferred embodiments, each of the pulses is a UWB pulse that has a time duration shorter than an expected range delay extent of a target, a different center frequency, is transmitted in a separate non-overlapping time slot, and occupies a respective sub-band of a total bandwidth. However, depending on the embodiment, one or more the following is applicable: multiple pulses may be sent at the same time; timeslots may be overlapping or disjointed; the bandwidths of the frequency sub-bands overlap; no pulse is sent in one or more frequency sub-bands; and the bandwidth of the transmitted frequency sub-bands is less than the total bandwidth of all available frequency sub-bands.

Next, reflections of the plurality of pulses are received (Step 2504). These reflections may be received by any of the receiver structures described herein or other capable devices. And then, pulse compression is performed on the received pulse reflections in order to produce a detection signal (Step 2506). The pulse compression may be performed by using any of the techniques described herein or other suitable techniques to result in the detection signal, such as those described herein. Generally, pulse compression is understood to be the process of taking some collection of signals, each occupying a portion of a total bandwidth and constructing a response having a resolution given by the total bandwidth occupied by the collection of signal. Thus, advantageously, this technique achieves radar resolution approximately equivalent to the transmission and reception of a single pulse having the total bandwidth. It is noted that according to several embodiments, the receiving step may be implemented to receive the reflections using a matched filter receiver that will optimize the reception of the transmitted waveform, as described above.

In contrast to known radar systems that use pulse compression techniques on many narrowband pulses (e.g., several hundred pulses) which have duration longer than the expected range delay extent of the target, several embodiments of the invention apply pulse compression techniques to pulses where the time duration is less than the expected range delay extent of the target. Furthermore, according to several embodiments of the present invention, the received return does not represent the frequency response of the entire range extent sampled at the transmission frequency as in conventional pulse compression radars, such as stepped and hopped frequency radars, it represents the response of multiple reflections of the transmitted pulse in the time domain extending over the entire range delay extent.

While the invention herein disclosed has been described by means of specific embodiments and applications thereof, numerous modifications and variations could be made thereto by those skilled in the art without departing from the scope of the invention set forth in the claims.

What is claimed is:

1. A method for performing radar comprising:
transmitting a plurality of pulses, each pulse having a different center frequency and a time duration shorter than an expected range delay extent of a target, wherein a total bandwidth is defined by a bandwidth occupied by the plurality of pulses;
receiving reflections of the plurality of pulses; and
performing pulse compression on the received pulse reflections to generate a detection signal having a radar resolution approximately equivalent to the transmission and reception of a single pulse having the total bandwidth.

2. The method of claim 1 wherein a bandwidth of at least one pulse is at least twenty percent of a center frequency of the pulse.

3. The method of claim 1 wherein a bandwidth of at least one pulse is at least 500 MHz.

4. The method of claim 1 wherein the transmitting step comprises:
transmitting the plurality of pulses such that at least two of the plurality of pulses overlap in time.

5. The method of claim 1 wherein the transmitting step comprises:
transmitting the plurality of pulses such that each pulse occupies a different one of a plurality of time slots.

6. The method of claim 1 wherein the total bandwidth is divided into frequency sub-bands, each pulse occupying a respective frequency sub-band.

7. The method of claim 1 wherein the receiving step comprises:
receiving the reflections of the plurality of pulses using a matched filter receiver based on a frequency and time sequence of the transmitted plurality of pulses.

8. The method of claim 1 further comprising:
aligning the received reflections in time prior to performing the pulse compression.

9. The method of claim 1 wherein the receiving step comprises:
generating I and Q data corresponding to the received reflections.

10. The method of claim 9 further comprising:
sampling the I and Q data for at least one range.

11. The method of claim 10 wherein the sampling step comprises:
sampling the I and Q data using an analog to digital converter for said at least one range.

12. The method of claim 10 wherein the sampling step further comprises:
sampling the I and Q data using the analog to digital converter two or more times per received pulse reflection for said at least one range.

13. The method of claim 10 wherein the sampling step comprises:
sampling the I and Q data using a track and hold circuit for said at least one range.

14. The method of claim 10 wherein the performing step comprises:
performing a discrete Fourier transform on the sampled I and Q data for said at least one range to produce a real output and an imaginary output;
squaring the real output;
squaring the imaginary output; and
summing the squared real output and the squared imaginary output to produce the detection signal.

15. The method of claim 1 wherein the receiving step comprises:
generating I and Q data corresponding to the received reflections;
the method further comprising:
generating a real component of an intermediate quantity for each received reflection;
generating an imaginary component of the intermediate quantity for each received reflection, the intermediate quantity defined as:

$$e^{-j2\pi f_k t}(I_k(t)+jQ_k(t)),$$

where $I_k(t)$ is the I data as a function of time, where $Q_k(t)$ is the Q data as a function of time, and where $f_k$ is a center frequency of the $k^{th}$ received reflection.

16. The method of claim 15 further comprising:
aligning the real components in time for the received reflections;
aligning the imaginary components in time for the received reflections; and
wherein the performing step comprises:
summing the real components to produce a first sum;
summing the imaginary components to produce a second sum;
squaring the first sum to produce a first squared sum;
squaring the second sum to produce a second squared sum; and
summing the first squared sum and the second squared sum to produce the detection signal.

17. The method of claim 15 further comprising:
using a track and hold circuit to align a sum of the real components and a sum of the imaginary components in time for the received reflections;
wherein the performing step comprises:
squaring the sum of the real components to produce a first squared sum;
squaring the sum of the imaginary components to produce a second squared sum; and
summing the first squared sum and the second squared sum to produce the detection signal.

18. The method of claim 1 wherein the transmitting step comprises:
transmitting the plurality of pulses according to a defined frequency and time sequence from a first radar transmitting device;
the method further comprising:
using a matched filter based on the defined frequency and time sequence on the received reflections in order to improve the signal to noise and interference ratio of the received reflections in the presence of a second radar transmitting device.

19. The method of claim 1 wherein the transmitting step comprises:
transmitting the plurality of pulses according to a defined frequency and time sequence; and
varying the defined frequency and time sequence based on channel conditions.

20. The method of claim 1 wherein the transmitting step comprises:
   transmitting multiple sets of the plurality of pulses varying a defined frequency and time sequence for the transmission of each set;
   the method further comprising:
   constructing a combined profile signal based on the detection signal generated from the received reflections of the plurality of pulses for each of the multiple sets, wherein aliasing of ranges is reduced.

21. The method of claim 20 wherein the transmitting the multiple sets comprises:
   transmitting the multiple sets of the plurality of pulses randomly varying the defined frequency and time sequence for the transmission of each set.

22. The method of claim 20 wherein the constructing comprises:
   integrating the detection signals from the received reflections of the plurality of pulses for each of the multiple sets.

23. The method of claim 20 wherein the constructing comprises:
   averaging the detection signals from the received reflections of the plurality of pulses for each of the multiple sets.

24. The method of claim 1 wherein the transmitting step comprises:
   transmitting the plurality of pulses according to a defined frequency and time sequence from a first radar transmitting device;
   wherein the defined frequency and time sequence is selected to be different than frequency and time sequences of other collocated radar transmitting devices.

25. The method of claim 24 wherein the frequency and time sequence is selected to be substantially orthogonal to the frequency and time sequences of the other collocated radar transmitting devices.

26. The method of claim 24 further comprising:
   varying the defined frequency and time sequence over time based on channel conditions in use.

27. The method of claim 1 wherein the detection signal is approximately $|D(t)|^2$,
   where $$D(t) = \sum_{k=0}^{N-1} e^{-j\omega_k t} Z_k(t),$$

where $Z_k(t) = I_k(t) + jQ_k(t)$
   where $I_k(t)$ is I data and $Q_k(t)$ is Q data generated from the received reflection of the $k^{th}$ frequency pulse; and
   where N is a total number of the pulses.

28. An apparatus for performing radar comprising:
   means for transmitting a plurality of pulses, each pulse having a different center frequency and a time duration shorter than an expected range delay extent of a target, wherein a total bandwidth is defined by a bandwidth occupied by the plurality of pulses;
   means for receiving reflections of the plurality of pulses; and
   means for performing pulse compression on the received pulse reflections to generate a detection signal having a radar resolution approximately equivalent to the transmission and reception of a single pulse having the total bandwidth.

29. An apparatus for performing radar comprising:
   an antenna;
   a switch coupled to the antenna that switches between transmitting and receiving;
   a transmitter coupled to the switch, the transmitter configured to transmit a plurality of pulses, each pulse having a different center frequency and a time duration shorter than an expected range delay extent of a target, wherein a total bandwidth is defined by a bandwidth occupied by the plurality of pulses; and
   a receiver coupled to the switch, the receiver comprising:
      a pulse compression module configured to perform pulse compression on received pulse reflections of the plurality of pulses to generate a detection signal having a radar resolution approximately equivalent to the transmission and reception of a single pulse having the total bandwidth.

30. The apparatus of claim 29 wherein the transmitter is configured to transmit the plurality of pulses such that a bandwidth of at least one pulse is at least twenty percent of a center frequency of the pulse.

31. The apparatus of claim 29 wherein the transmitter is configured to transmit the plurality of pulses such that a bandwidth of at least one pulse is at least 500 MHz.

32. The apparatus of claim 29 wherein the transmitter is configured to transmit the plurality of pulses such that at least two of the plurality of pulses overlap in time.

33. The apparatus of claim 32 wherein the receiver comprises a matched filter receiver based on a frequency and time sequence of the transmitted plurality of pulses.

34. The apparatus of claim 29 wherein the transmitter is configured to transmit the plurality of pulses such that each pulse occupies a different one of a plurality of time slots.

35. The apparatus of claim 29 wherein the transmitter is configured to transmit the plurality of pulses such that the total bandwidth is divided into frequency sub-bands, each pulse occupying a respective frequency sub-band.

36. The apparatus of claim 29 wherein the receiver further comprises:
   a pulse detector coupled to the switch and configured to receive the received reflections; and
   a decoder coupled to the pulse detector and configured to align the received reflections in time prior to being input to the pulse compression module.

37. The apparatus of claim 29 wherein the pulse detector comprises:
   an IQ downconverter configured to convert the received reflections of the plurality of pulses into corresponding I and Q data.

38. The apparatus of claim 37 wherein the decoder comprises:
   a sampler configured to sample the I and Q data for at least one range.

39. The apparatus of claim 38 wherein the sampler comprises an analog to digital converter.

40. The apparatus of claim 39 wherein the pulse compression module comprises:
   a discrete Fourier transform module coupled to the sampler, the discrete Fourier transform module configured to perform a discrete Fourier transform on the sampled I and Q data for said at least one range and output a real output and an imaginary output;
   a squarer coupled to the discrete Fourier transform module, the squarer configured to square the real output and square the imaginary output for each of said at least one range; and a summer coupled to the output of the squarer and configured to sum squared real output and the squared imaginary output to produce the detection signal.

41. The apparatus of claim 29 wherein the pulse detector comprises:
an IQ downconverter configured to convert the received reflections of the plurality of pulses into corresponding I and Q data;
wherein the receiver further comprises:
a combiner circuit coupled to an output of the IQ downconverter and configured to generate a real component and an imaginary component of an intermediate quantity for each received reflection, the intermediate quantity defined as:

$$e^{-j2\pi f_k t}(I_k(t)+jQ_k(t)),$$

where $I_k(t)$ is the I data as a function of time, where $Q_k(t)$ is the Q data as a function of time, and where $f_k$ is a center frequency of the $k^{th}$ received reflection.

42. The apparatus of claim 41 further comprising:
a delay circuit coupled to an output of the combiner circuit and configured to align the real components in time for the received reflections and align the imaginary components in time for the received reflections;
wherein the pulse compression module comprises:
a first summer coupled to an output of the delay circuit to sum the real components to produce a first sum;
a second summer coupled to the output of the delay circuit to sum the imaginary components to produce a second sum;
a first squarer coupled to an output of the first summer and configured to square the first sum to produce a first squared sum;
a second squarer coupled to an output of the second summer and configured to square the second sum to produce a second squared sum;
a third summer coupled to an output of the first squarer and an output of the second squarer and configured to sum the first squared sum and the second squared sum to produce the detection signal.

43. The apparatus of claim 41 further comprising:
a first track and hold circuit coupled to an output of the combiner circuit and configured to align a sum of the real components in time for the received reflections;
a second track and hold circuit coupled to an output of the combiner circuit and configured to align a sum of the imaginary components in time for the received reflections;
wherein the pulse compression module comprises:
a first squarer coupled to an output of the first track and hold circuit and configured to square the sum of the real components to produce a first squared sum;
a second squarer coupled to an output of the second track and hold circuit and configured to square the sum of the imaginary components to produce a second squared sum;
a summer coupled to an output of the first squarer and an output of the second squarer and configured to sum the first squared sum and the second squared sum to produce the detection signal.

44. The apparatus of claim 29 wherein the transmitter comprises:
a pulse generator coupled to the switch; and
an encoder coupled to the pulse generator, the encoder configured to cause the pulse generator to transmit the plurality of pulses according to a defined frequency and time sequence;
wherein the receiver further comprises:
a matched filter based on the defined frequency and time sequence on the received reflections in order to improve the signal to noise and interference ratio of the received reflections in the presence of another radar transmitting device.

45. The apparatus of claim 29 wherein the transmitter comprises:
a pulse generator coupled to the switch; and
an encoder coupled to the pulse generator, the encoder configured to cause the pulse generator to transmit the plurality of pulses according to a defined frequency and time sequence;
wherein the receiver further comprises:
a channel estimator configured to take a measurement relating to the received reflections,
wherein the encoder is further coupled to the channel estimator and is configured to cause the pulse generator to vary the defined frequency and time sequence based on the measurement.

46. The apparatus of claim 29 wherein the transmitter comprises:
a pulse generator coupled to the switch; and
an encoder coupled to the pulse generator, the encoder configured to cause the pulse generator to transmit multiple sets of the plurality of pulses varying a defined frequency and time sequence for the transmission of each set;
wherein the receiver further comprises:
a range profile combiner coupled to the pulse compression module and adapted to construct a range profile based on the detection signal generated from the received reflections of the plurality of pulses for each of the multiple sets, wherein aliasing of ranges is reduced.

47. The apparatus of claim 29 wherein the transmitter comprises:
a pulse generator coupled to the switch; and
an encoder coupled to the pulse generator, the encoder configured to cause the pulse generator to transmit the plurality of pulses according to a defined frequency and time sequence, wherein the defined frequency and time sequence is selected to be different than frequency and time sequences of other collocated radar transmitting devices.

48. The apparatus of claim 47 wherein the encoder is configured to select the frequency and time sequence to be substantially orthogonal to the frequency and time sequences of the other collocated radar transmitting devices.

49. The apparatus of claim 47 wherein the encoder is configured to vary the defined frequency and time sequence over time based on channel conditions in use.

50. The apparatus of claim 29 wherein the detection signal output from the pulse compression module is approximately $|D(t)|^2$,
where $$D(t) = \sum_{k=0}^{N-1} e^{-j\omega_k t} Z_k(t),$$

where $Z_k(t)=I_k(t)+jQ_k(t)$
where $I_k(t)$ is I data and $Q_k(t)$ is Q data generated from the received reflection of the $k^{th}$ frequency pulse; and
where N is a total number of the pulses.

* * * * *